US012372921B2

(12) United States Patent
Minami

(10) Patent No.: US 12,372,921 B2
(45) Date of Patent: Jul. 29, 2025

(54) IMAGE FORMING APPARATUS

(71) Applicant: Oki Electric Industry Co., Ltd., Tokyo (JP)

(72) Inventor: Kohei Minami, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 9 days.

(21) Appl. No.: 18/540,300

(22) Filed: Dec. 14, 2023

(65) Prior Publication Data

US 2024/0288822 A1 Aug. 29, 2024

(30) Foreign Application Priority Data

Feb. 24, 2023 (JP) ................................ 2023-027323

(51) Int. Cl.
*G03G 21/20* (2006.01)

(52) U.S. Cl.
CPC .................................. *G03G 21/206* (2013.01)

(58) Field of Classification Search
CPC ........... G03G 15/04036; G03G 21/206; G03G 21/1666; G03G 2221/1636; G03G 2221/1645
See application file for complete search history.

(56) References Cited

U.S. PATENT DOCUMENTS

2008/0253796 A1* 10/2008 Idehara ................ G03G 21/206 399/92
2013/0142538 A1* 6/2013 Miwa ................. G03G 21/1803 399/92
2014/0056612 A1* 2/2014 Mori .................. G03G 21/1628 399/110
2016/0085208 A1* 3/2016 Imai ....................... G03G 21/20 347/118
2023/0324848 A1* 10/2023 Kawasumi ........... G03G 21/206

FOREIGN PATENT DOCUMENTS

JP 2007-122044 A 5/2007

* cited by examiner

*Primary Examiner* — Thomas S Giampaolo, II
(74) *Attorney, Agent, or Firm* — Rabin & Berdo. P.C.

(57) ABSTRACT

An image forming apparatus comprises an image forming unit including a photosensitive drum (image bearing body) 11, and an exposure unit including an exposure head that emits light to expose the photosensitive drum to form a latent image. The exposure unit has a duct unit extending in the X direction (longitudinal direction) of the image forming unit. The duct unit has an inlet opening through which air flows into the duct unit and an outlet opening through which the air is discharged from the duct unit. The exposure unit is provided pivotably about a pivot axis (virtual straight line) passing through the inlet opening.

15 Claims, 18 Drawing Sheets

IMAGE FORMING APPARATUS

BACKGROUND OF THE INVENTION

1. Field of the Invention

The present disclosure relates to an image forming apparatus including an image forming unit.

2. Description of the Related Art

An image forming apparatus including an image forming unit that performs a printing operation is conventionally known (see, for example, Japanese Patent Application Publication No. 2007-122044 (see Abstract)).

SUMMARY OF THE INVENTION

As the printing operation progresses, the temperature of the image forming unit may increase. Thus, there is a need for a technology that suppresses an increase in the temperature of the image forming unit.

The present disclosure is made to solve the above problem, and an object of the present disclosure is to suppress an increase in the temperature of an image forming unit.

An image forming apparatus of the present disclosure includes an image forming unit including an image bearing body, and an exposure unit including an exposure portion that emits light to expose the image bearing body to form a latent image. The exposure unit has a duct unit extending in a longitudinal direction of the image forming unit. The duct unit has an inlet opening through which air flows into the duct unit and an outlet opening through which the air is discharged from the duct unit. The exposure unit is provided pivotably about a virtual straight line passing through the inlet opening.

According to the present disclosure, the image forming unit can be cooled with the air discharged from the outlet opening of the duct unit, and thus an increase in the temperature of the image forming unit can be suppressed. In addition, since the exposure unit is pivotable about the virtual straight line passing through the inlet opening of the duct unit, the exposure unit can be mounted to an opening-and-closing member or the like.

DETAILED DESCRIPTION OF THE INVENTION

First Embodiment (Configuration of Image Forming Apparatus)

Figure 1:
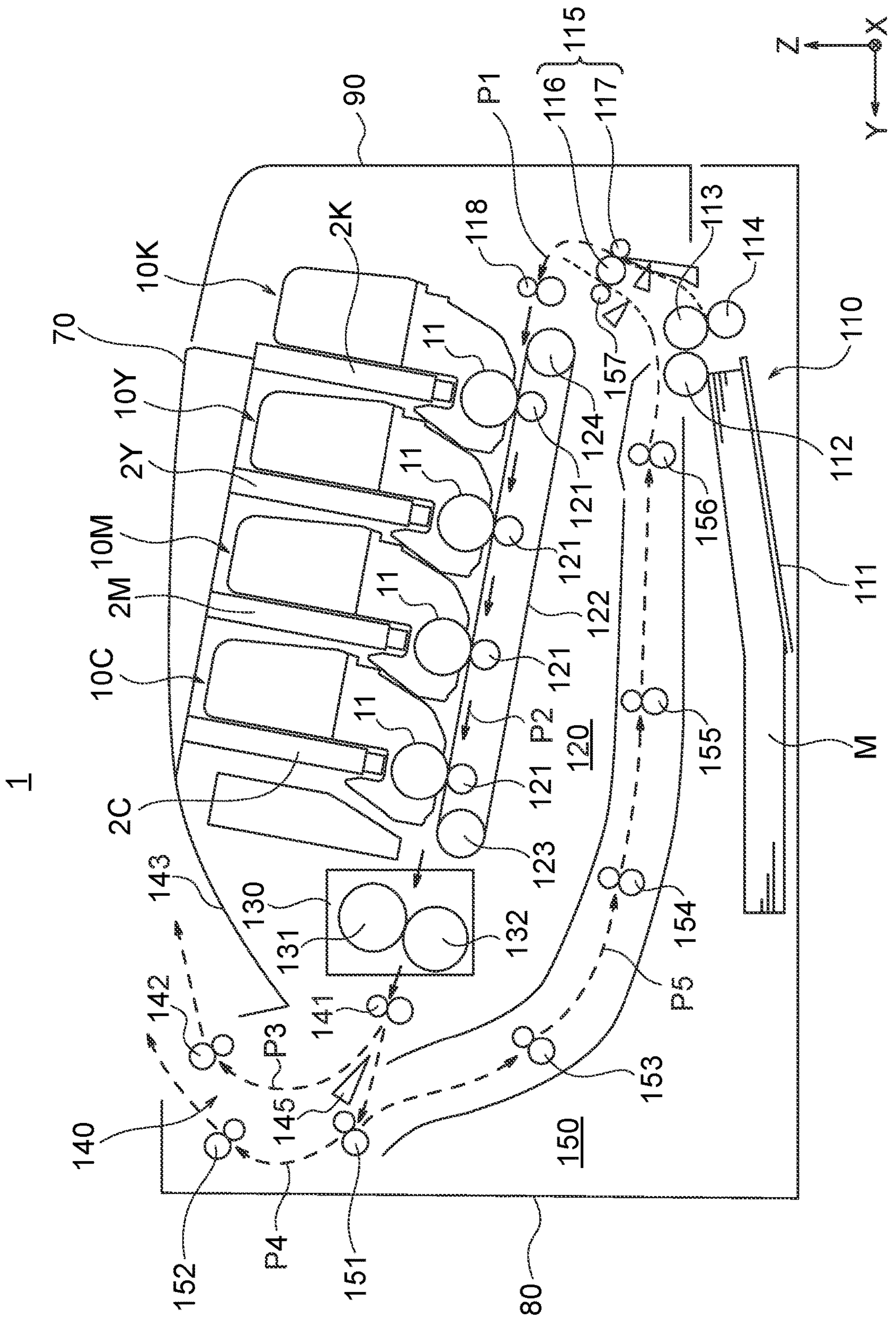
FIG. 1 is a diagram illustrating an entire configuration of an image forming apparatus of a first embodiment.

FIG. 1 is a diagram illustrating an entire configuration of an image forming apparatus 1 of a first embodiment. The image forming apparatus 1 is configured to form images by using an electrophotographic method. In this example, the image forming apparatus 1 is a color printer.

The image forming apparatus 1 includes a medium transport mechanism 110, image forming units 10K, 10Y, 10M, and 10C, a transfer unit 120, a fixing device (fuser) 130, and a medium ejection mechanism 140. The medium transport mechanism 110 transports media M. The image forming unit 10K, 10C, 10M, and 10Y form toner images (developer images) on the medium M. The transfer unit 120 transfers the toner images onto the medium M. The fixing device 130 fixes the toner images onto the medium M. The medium ejection mechanism 140 ejects the medium M.

These components of the image forming apparatus 1 are accommodated in a housing 80, which is an apparatus casing. A top cover 70, which is an opening-and-closing member, is provided on top of the housing 80. A front cover 90 is provided at the front side of the housing 80.

The medium transport mechanism 110 has a medium feeding tray 111 that stores a stack of the media M such as printing paper, a pickup roller 112 disposed to contact the topmost medium M stored in the medium feeding tray 111, a feed roller 113 disposed adjacent to the pickup roller 112, and a retard roller 114 disposed to face the feed roller 113.

The pickup roller 112 contacts the medium M in the medium feeding tray 111 and rotates to draw the medium M from the medium feeding tray 111. The feed roller 113 feeds the medium M drawn by the pickup roller 112 into a feeding transport path P1. The retard roller 114 rotates in a direction opposite to a feeding direction by the feed roller 113, thereby applying transport resistance to the medium M in order to prevent duplicate feeding of the media M.

The medium transport mechanism 110 also has a transport roller pair 115 and a transport roller pair 118 along the feeding transport path P1 for the medium M. The transport roller pair 115 includes a registration roller 116 and a pinch roller 117. The transport roller pair 115 starts rotating at predetermined timing after a leading end of the medium M contacts a nip portion between the rollers 116 and 117, thereby correcting the skew of the medium M, and then transports the medium M. The transport roller pair 118 includes a pair of rollers and transports the medium M from the transport roller pair 115 to the transfer unit 120.

The image forming units 10K, 10Y, 10M, and 10C are arranged along a transporting direction of the medium M (from right to left in FIG. 1). The image forming units 10K, 10Y, 10M, and 10C form black, yellow, magenta, and cyan toner images, respectively.

Exposure units 2K, 2Y, 2M, and 2C are disposed to face respective photosensitive drums 11 (described below) of the image forming units 10K, 10Y, 10M, and 10C, respectively.

The image forming units 10K, 10Y, 10M, and 10C have a common configuration except for toners used therein, and thus they are simply referred to as "image forming units 10". The exposure units 2K, 2Y, 2M, and 2C are simply referred to as "exposure units 2".

Figure 2:
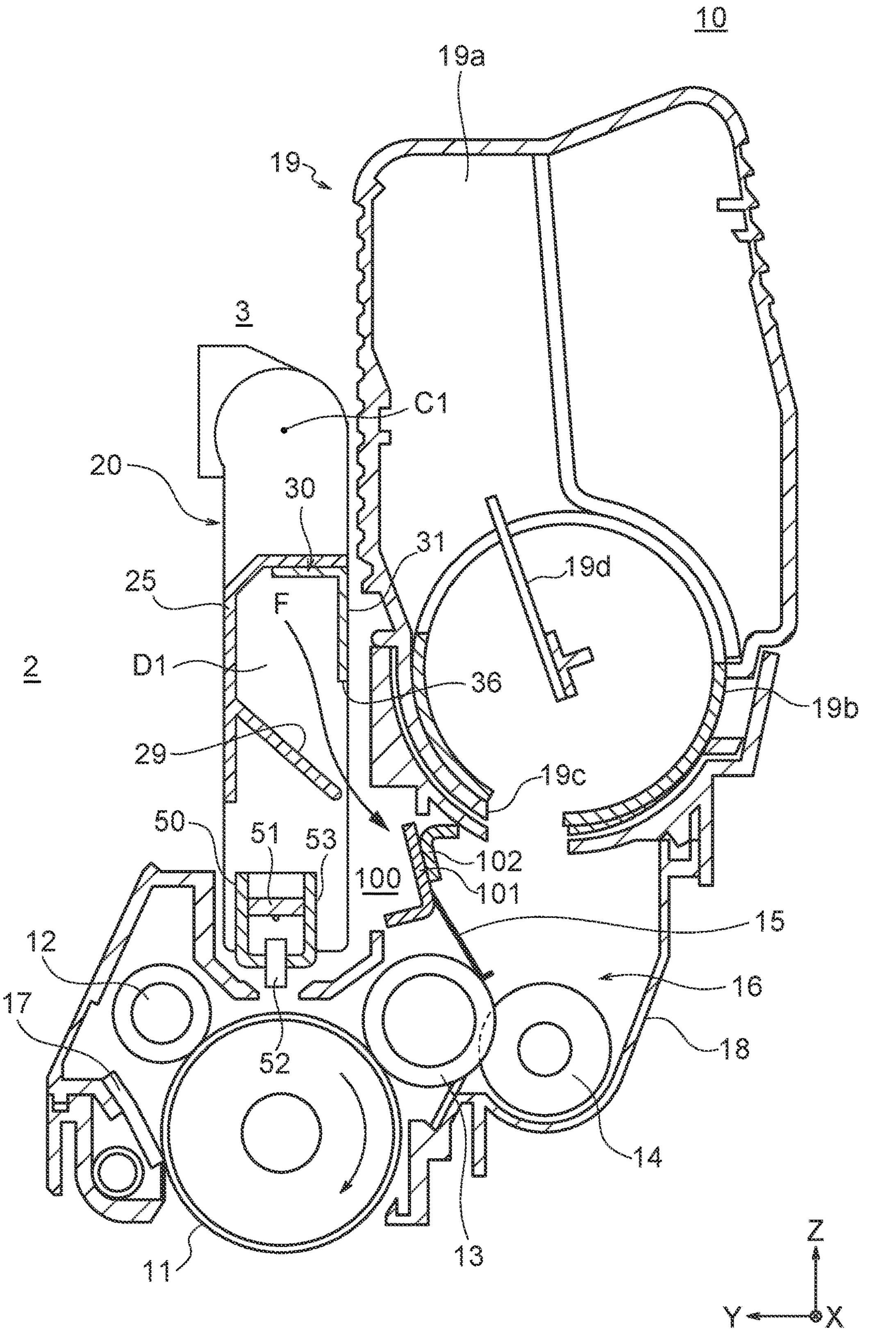
FIG. 2 is a sectional view illustrating an image forming unit and an exposure unit of the first embodiment.

FIG. 2 is a sectional view illustrating a configuration of the image forming unit 10. As illustrated in FIG. 2, the image forming unit 10 has the photosensitive drum 11 serving as an image bearing body. The photosensitive drum 11 is a cylindrical member including a photosensitive layer (including charge generation layers and charge transport layers) provided on a surface of a conductive base body, and rotates clockwise in FIG. 1.

The image forming unit 10 further has a charging roller 12 as a charging member, a developing roller 13 as a developer bearing body, a supply roller 14 as a supply member, a developing blade 15 as a layer regulating member, a cleaning member 17, and a unit casing 18 in which these components are housed.

The charging roller 12 is disposed to contact the surface of the photosensitive drum 11 and rotates following the rotation of the photosensitive drum 11. The charging roller 12 is applied with a charging voltage, and uniformly charges the surface of the photosensitive drum 11. An electrostatic latent image is formed on the uniformly charged surface of the photosensitive drum 11 by irradiation with light from the exposure unit 2.

The developing roller 13 is disposed to contact the surface of the photosensitive drum 11 and rotates in the direction opposite to that of the photosensitive drum 11. The developing roller 13 is applied with a developing voltage, and causes the toner to adhere to the electrostatic latent image formed on the surface of the photosensitive drum 11 to thereby form a toner image.

The supply roller 14 is disposed to contact or face the surface of the developing roller 13 and rotates in the same direction as the developing roller 13. The supply roller 14 is applied with a supply voltage, and supplies the toner to the developing roller 13.

The developing blade 15 is a metal blade that is elongated in the axial direction of the developing roller 13. The developing blade 15 is fixed by a fixing member 102 to a blade holder 101 provided in the unit casing 18.

The developing blade 15 has a bent portion, which is pressed against the surface of the developing roller 13. The developing blade 15 regulates the thickness of a toner layer formed on the surface of the developing roller 13. A portion including the developing blade 15, the blade holder 101, and the fixing member 102 is also referred to as a layer regulating unit 100 (i.e., a layer regulator).

The cleaning member 17 is a blade or roller disposed to contact the surface of the photosensitive drum 11. The cleaning member 17 scrapes off the toner remaining on the surface of the photosensitive drum 11 after the transfer of the toner image.

In the unit casing 18 of the image forming unit 10, a toner storage portion 16 is formed above the developing roller 13, supply roller 14, and the developing blade 15.

A toner cartridge 19 as a developer storage container is detachably attached to an upper portion of the unit casing 18 of the image forming unit 10. The toner cartridge 19 has a toner storage portion 19*a* that stores the toner, a shutter 19*c* that opens and closes a toner supply port 19*b* provided at the bottom of the toner storage portion 19*a*, and an agitator bar 19*d* that agitates the toner. The toner cartridge 19 supplies the toner to the toner storage portion 16.

The exposure unit 2 (i.e., an exposure device) has an exposure head 50 as an exposure portion, a head holder 20 as a holder that holds the exposure head 50, and a duct forming body 30 that is combined with the head holder 20 to form ducts D1 and D2 (described later). The head holder 20 and the duct forming body 30 constitute a duct unit 3 (i.e., an air duct or a duct body).

The exposure head 50 has a substrate 51 on which light-emitting elements are arranged in a row, a lens array 52 having lens elements which are arranged in a row, and a casing 53 that supports these components. The arrangement directions of the light-emitting elements and the lens elements are parallel to the axial direction of the photosensitive drum 11. The light-emitting element is, for example, a light-emitting diode (LED). The lens element is a rod lens, microlens, or the like. The lens element focuses the light from the light-emitting element onto the surface of the photosensitive drum 11. The casing 53 is formed of a resin such as a liquid crystal polymer.

The head holder 20 is supported by the top cover 70 (FIG. 1) of the image forming apparatus 1 in a suspended manner and holds the exposure head 50 in such a manner that the exposure head 50 faces the photosensitive drum 11. The duct forming body 30 is disposed on the image forming unit 10 side (i.e., in the −Y direction) of the head holder 20. The head holder 20 and the duct forming body 30 will be described later.

As illustrated in FIG. 1, the transfer unit 120 includes an endless transfer belt 122, a drive roller 123 and an idle roller 124 around which the transfer belt 122 is stretched, and four transfer rollers 121 disposed to face the respective photosensitive drums 11 of the image forming units 10K, 10Y, 10M, and 10C via the transfer belt 122.

The transfer belt 122 travels in such a manner that the medium M adheres to the surface of the transfer belt 122 by electrostatic force and is held on the surface of the transfer belt 122. The drive roller 123 rotates counterclockwise in FIG. 1 to cause the transfer belt 122 to travel in the direction indicated by arrow P2. The idle roller 124 applies tension to the transfer belt 122. The transfer roller 121 is applied with a transfer voltage, and transfers the toner image from the photosensitive drum 11 to the medium M on the transfer belt 122.

The fixing device 130 is disposed downstream of the transfer unit 120 in the transporting direction of the medium M. The fixing device 130 has a heating roller 131 having a heat source, and a pressure roller 132 that is pressed against the surface of the heating roller 131. The heating roller 131 and the pressure roller 132 apply heat and pressure to the toner image on the medium M to thereby fix the toner image to the medium M.

The medium ejection mechanism 140 has ejection rollers 141 and 142 that are disposed downstream of the fixing device 130 in the transporting direction of the medium M. The ejection rollers 141 and 142 transport the medium M along an ejection transport path P3 toward a medium outlet port and eject the medium M to the outside of the image forming apparatus 1. A stacker portion 143 for placing the media M ejected by the ejection rollers 141 and 142 is provided on the top cover of the image forming apparatus 1.

For double-sided printing, the image forming apparatus 1 includes a re-transport mechanism 150 that transports the medium M with the toner image fixed thereon back to the feeding transport path P1. A switching guide 145 for switching the transport path for the medium M is disposed downstream of the ejection rollers 141 in the ejection transport path P3. The switching guide 145 is capable of guiding the medium M to a retreat path P4 provided adjacent to the ejection transport path P3.

The re-transport mechanism 150 includes transport rollers 151 and 152 that feed the medium M guided from the switching guide 145 to the retreat path P4 and then feeds the medium M in the opposite direction, and transport rollers 153, 154, 155, and 156 that transport the medium M having been fed out from the retreat path P4 along a return transport path P5.

The return transport path P5 merges with the feeding transport path P1 on the upstream side of the transport rollers 118. A transport roller 157 that contacts the registration roller 116 described above is provided near an exit of the return transport path P5. In a case where the image forming apparatus 1 does not have the function of double-sided printing, the image forming apparatus 1 may be configured to have no re-transport mechanism 150.

In FIG. 1, the image forming apparatus 1 is placed on an XY plane (for example, a horizontal plane). The axial direction of the photosensitive drum 11 and each roller of the image forming apparatus 1 is defined as an X direction. The X direction is the width direction of the image forming apparatus 1 and is also the width direction of the medium M. The direction orthogonal to the X direction on the XY plane is defined as a Y direction (in this example, the front-back direction). The direction orthogonal to the XY plane is a Z direction (in this example, the vertical direction).

The X, Y, and Z directions do not limit the orientation of the image forming apparatus 1. The arrangement direction of the image forming units 10K, 10Y, 10M, and 10C is inclined relative to the XY plane in FIG. 1, but it does not necessarily have to be inclined. The image forming unit 10 has a shape elongated in the axial direction of the photosensitive drum 11, i.e., in the X direction.

(Configuration of Exposure Unit)

Next, the configuration of the exposure unit 2 will be described. The exposure unit 2 is mounted to the top cover 70 which is openable and closable. The configuration of the exposure unit 2 will be described using the X, Y, and Z directions, assuming that the top cover 70 is located in a closed position.

Figure 3:
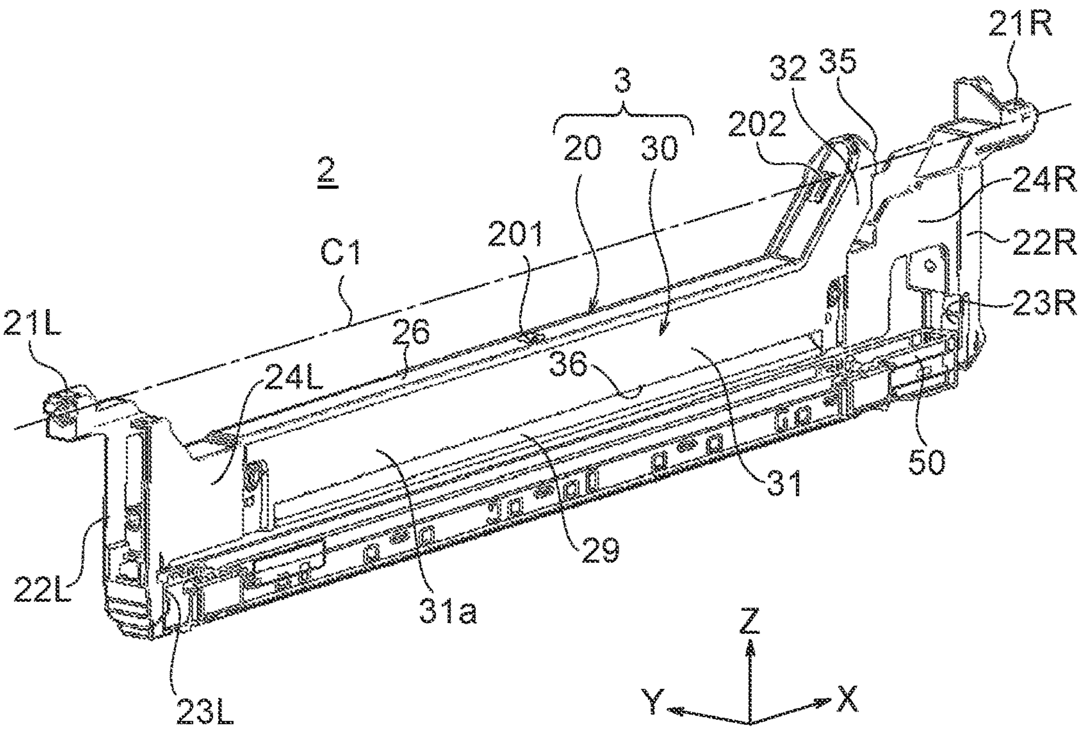
FIG. 3 is a perspective view illustrating the exposure unit of the first embodiment.

FIG. 3 is a perspective view illustrating the exposure unit 2. As described above, the exposure unit 2 has the head holder 20, the duct forming body 30, and the exposure head 50. The head holder 20, the duct forming body 30, and the exposure head 50 all have a shape elongated in the X direction.

The head holder 20 holds the exposure head 50 at its end in the −Z direction (lower end). The head holder 20 is formed of a resin such as acrylonitrile butadiene styrene (AES) copolymer or polyacetal, for example. The head holder 20 has a shape elongated in the X direction as a whole.

The head holder 20 has support shafts 21L and 21R at both ends thereof in the X direction. The support shafts 21L and 21R engage shaft support portions 72 (see FIG. 10(A)) provided on the top cover 70. By the engagement of the support shafts 21L and 21R with the shaft support portions 72, the exposure unit 2 is supported pivotably about a pivot axis C1, which is a virtual straight line in the X direction.

The head holder 20 has arms 22L and 22R at both ends thereof in the X direction. The arms 22L and 22R extend downward, i.e., in the −Z direction, from the support shafts 21L and 21R, respectively. Holding grooves 23L and 23R are formed at the ends of the arms 22L and 22R in the −Z direction, respectively. The holding grooves 23L and 23R face each other in the X direction. Both ends of the exposure head 50 in the X direction are held in the holding grooves 23L and 23R.

The head holder 20 has side walls 24L and 24R disposed on the inner sides of and adjacent to the arms 22L and 22R in the X direction, respectively. The side walls 24L and 24R are located at the end of the head holder 20 in the −Y direction. The side walls 24L and 24R are spaced apart from each other in the X direction, and the duct forming body 30 is mounted between the side walls 24L and 24R. The height of the side walls 24L and 24R in the Z direction is lower than the pivot axis C1.

Figure 4:
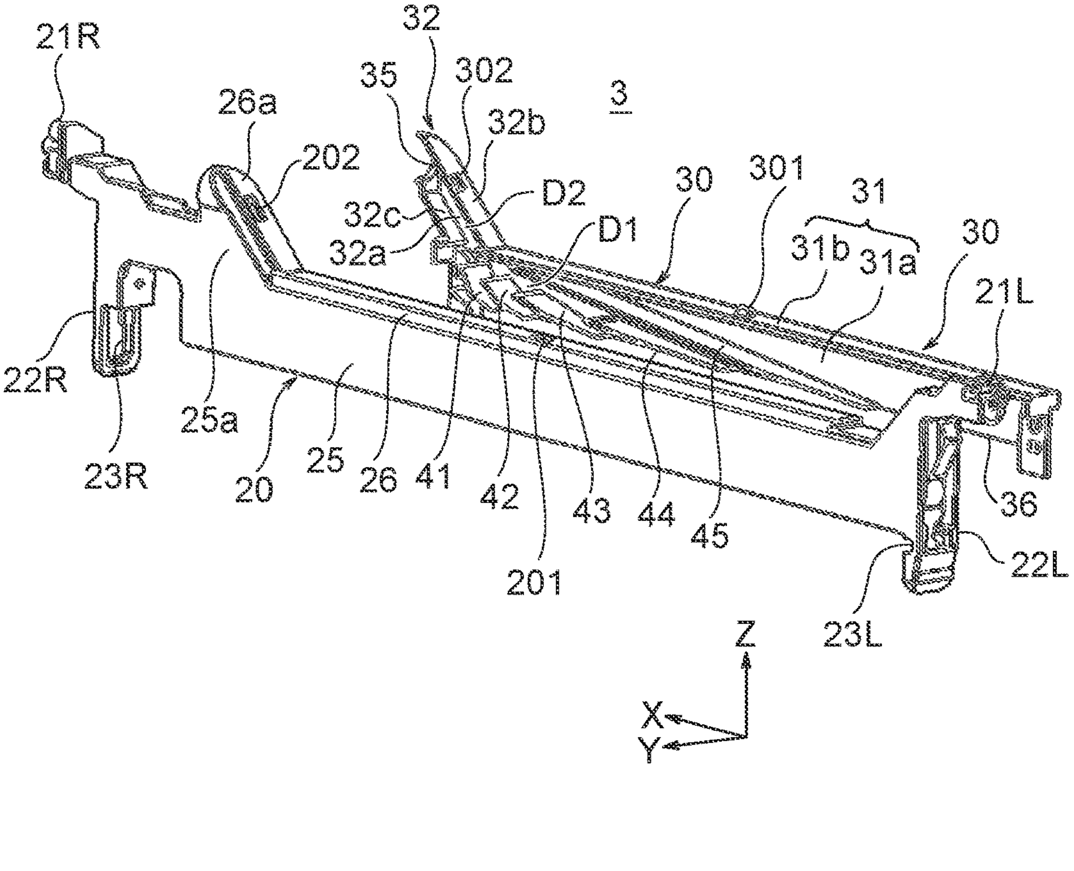
FIG. 4 is an exploded perspective view illustrating a duct unit of the first embodiment.

FIG. 4 is a perspective view illustrating the duct unit 3, i.e., the head holder 20 and the duct forming body 30. The head holder 20 has a side wall 25 extending in the X direction between the arms 22L and 22R. The side wall 25 is located at the end of the head holder 20 in the +Y direction.

The height of the side wall 25 in the Z direction is lower than the height of the pivot axis C1 except for an extending portion 25*a* described next. The side wall 25 has the extending portion 25*a* adjacent to the arm 22R and extending to the same height in the Z direction as the pivot axis C1. The extending portion 25*a* is inclined so as to be displaced in the +Z direction as it goes in the +X direction (i.e., as a distance to the support shaft 21R decreases).

The head holder 20 has a top plate 26. The top plate 26 overhangs in the −Y direction from an end in the +Z direction (upper end) of the side wall 25 and extends in the X direction. At the end of the top plate 26 in the +X direction, an inclined portion 26*a* is provided to extend along the extending portion 25*a*.

In addition, an inclined plate 29 (FIG. 2) that is inclined in the YZ plane is formed at an inner surface of the side wall 25 (i.e., a surface of the side wall 25 in the −Y direction). The inclined plate 29 is inclined so as to be displaced in the −Z direction as it goes apart from the side wall 25 in the −Y direction.

The duct forming body 30 has a main portion 31 extending in the +X direction and an inclined portion 32 formed on the side of the main portion 31 in the +X direction. The inclined portion 32 is inclined so as to be displaced in the +Z direction as it goes in the +X direction.

The main portion 31 of the duct forming body 30 has a side wall 31*a* facing the side wall 25 of the head holder 20 in the Y direction and a top plate 31*b* overlapping the top plate 26 of the head holder 20. The main duct D1 is formed between the side wall 31*a* and the top plate 31*b* of the main portion 31 and the side wall 25 and the inclined plate 29 of the head holder 20.

The inclined portion 32 of the duct forming body 30 has a side wall 32*a* facing the extending portion 25*a* of the side wall 25 of the head holder 20 in the Y direction, a top plate 32*b* overlapping the inclined portion 26*a* of the top plate 26 of the head holder 20, and a bottom plate 32*c* facing the top plate 32*b*. The introduction duct D2 is formed between the side wall 32*a*, the top plate 32*b* and the bottom plate 32*c* of the inclined portion 32 and the side wall 25 (extending portion 25*a*) of the head holder 20.

An inlet opening 35 as a first opening is formed at the end of the inclined portion 32 of the duct forming body 30 in the +X direction. The inlet opening 35 is located on the pivot axis C1.

An outlet opening 36 as a second opening is formed at the end (lower end) of the main portion 31 of the duct forming body 30 in the −Z direction. More specifically, as illustrated in FIG. 3, the outlet opening 36 is an opening formed between the end of the side wall 31*a* of the main portion 31 in the −Z direction and the inclined plate 29 of the head holder 20. The outlet opening 36 faces the image forming unit 10.

A latch 301 is formed in the top plate 31*b* of the main portion 31 of the duct forming body 30. A hole portion 201 that engages the latch 301 is formed at the center of the top plate 26 of the head holder 20.

A latch 302 is formed on the top plate 32*b* of the inclined portion 32 of the duct forming body 30. A hole portion 202 that engages the latch 302 is formed on the inclined portion 26*a* of the top plate 26 of the head holder 20.

Figure 5:
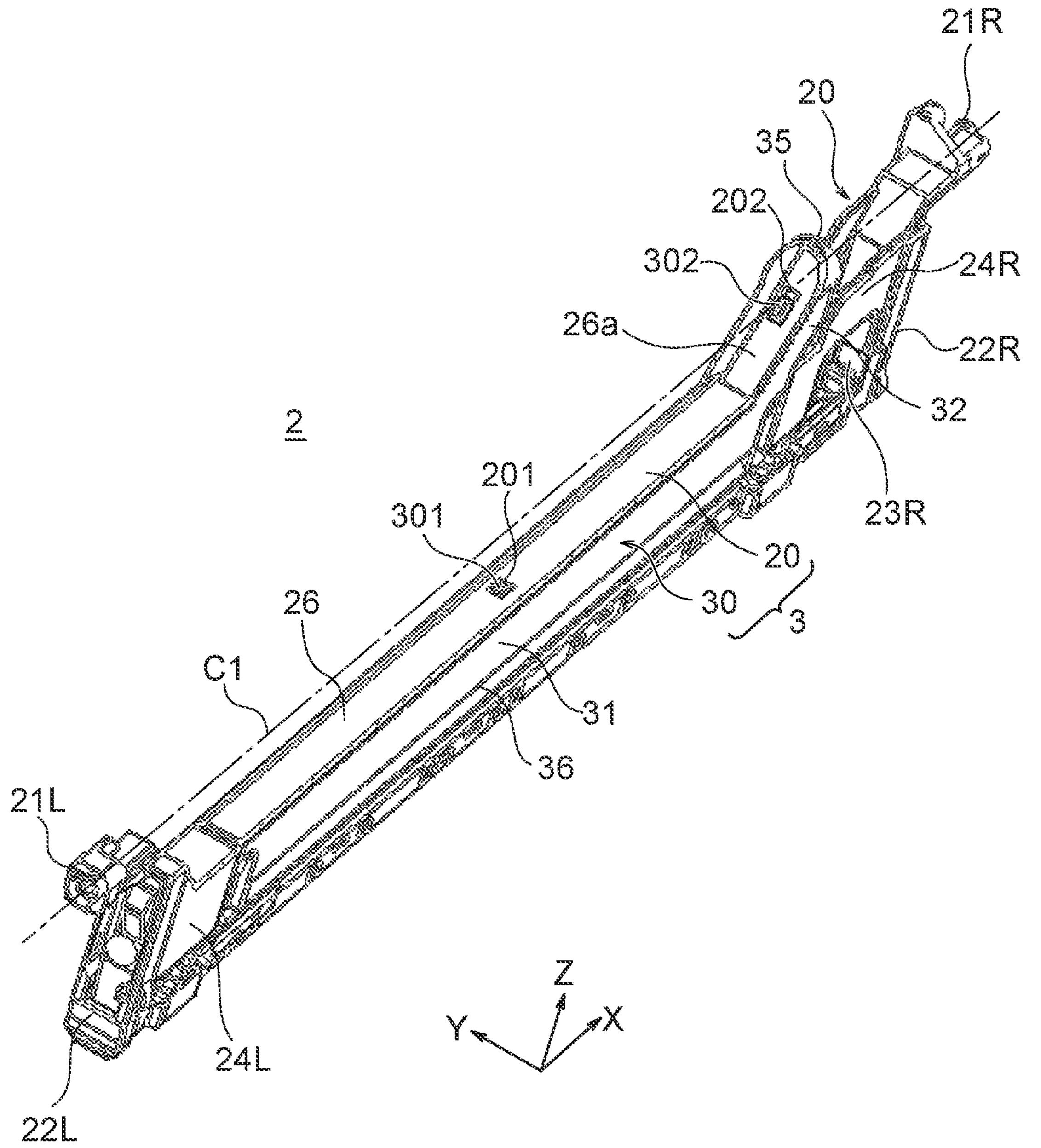
FIG. 5 is a perspective view illustrating the exposure unit of the first embodiment.

As illustrated in FIG. 5, the head holder 20 and the duct forming body 30 are fixed together by the engagement between the latch 301 and the hole portion 201 and by the engagement between the latch 302 and the hole portion 202. The duct unit 3 is formed by the head holder 20 and the duct forming body 30. The duct unit 3 has the main duct D1 and the introduction duct D2 described above.

Figure 6:
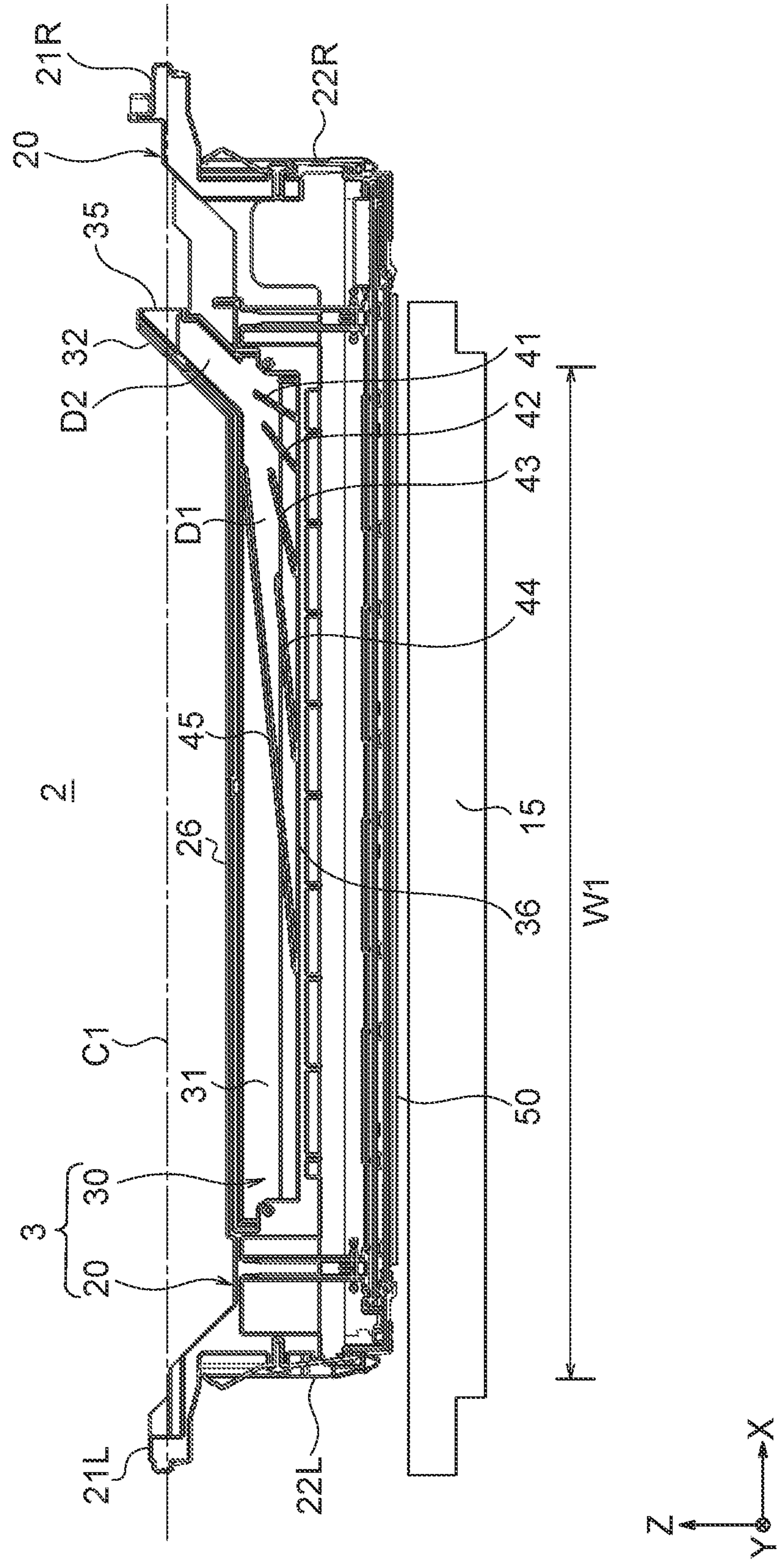
FIG. 6 is a sectional view illustrating the exposure unit of the first embodiment.

FIG. 6 is a sectional view illustrating the exposure unit 2, taken along a plane parallel to the XZ plane. FIG. 6 also illustrates the position of the developing blade 15 of the image forming unit 10. As illustrated in FIG. 6, the inlet opening 35 is located at an end of the introduction duct D2 in the +X direction. Air from a fan unit 60 (FIG. 9) described later flows into the inlet opening 35.

The main portion 31 of the duct forming body 30 is provided with a partition plate 45. The partition plate 45 is inclined so as to be displaced in the −Z direction (i.e., displaced closer to the outlet opening 36) as it goes in the −X direction (i.e., as a distance from the introduction duct D2 increases).

The main duct D1 is a region on the introduction duct D2 side with respect to the partition plate 45 in the duct unit 3. The outlet opening 36 is located on the −Z side of the main duct D1. With this configuration, air flowing into the duct unit 3 through the inlet opening 35 flows to the main duct D1 through the introduction duct D2 and is then discharged from the outlet opening 36.

The main duct D1 is provided with ribs 41, 42, 43, and 44. The ribs 41, 42, 43, and 44 are formed on the side wall 31*a* of the main portion 31 of the duct forming body 30. The ribs 41, 42, 43, and 44 are arranged in this order from the side closer to the inlet opening 35.

Each of the ribs 41, 42, 43, and 44 is inclined so as to be displaced in the −Z direction (i.e., displaced closer to the outlet opening 36) as it goes in the −X direction (i.e., as a distance from the introduction duct D2 increases). The ribs 41, 42, 43, and 44 are also referred to as the first rib, second rib, third rib, and fourth rib, respectively.

Figure 7A:
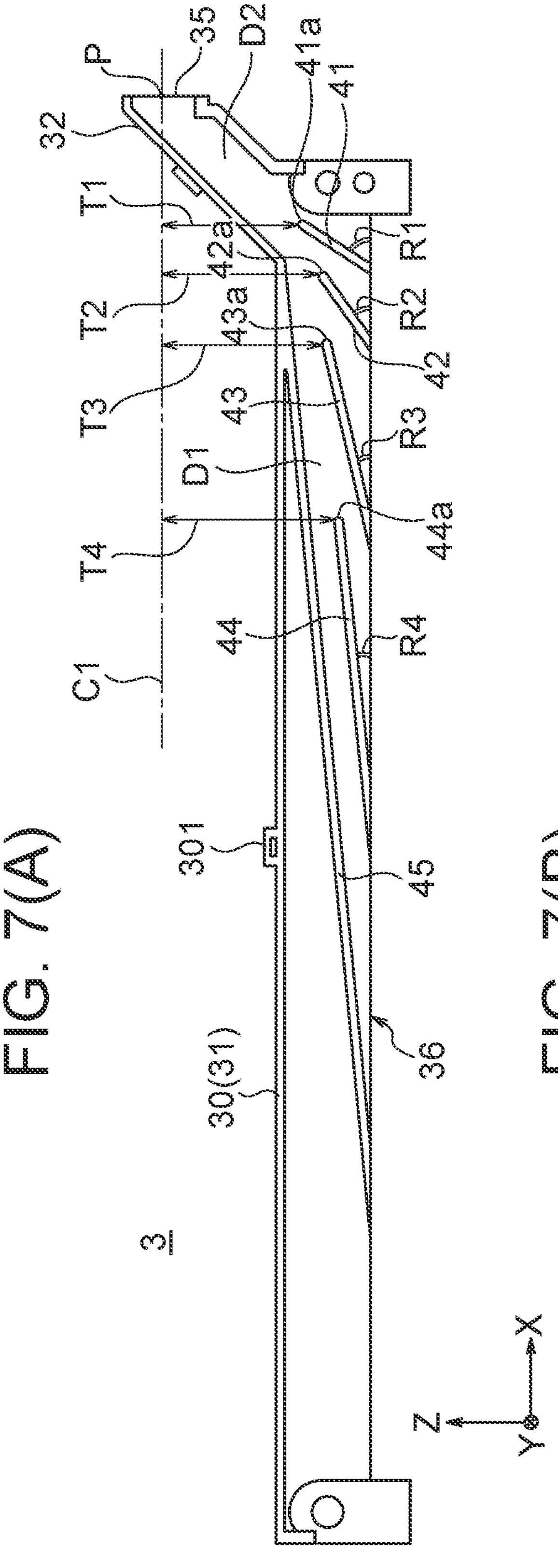
FIGS. 7(A) and 7(B) are schematic diagrams illustrating the duct unit of the exposure unit of the first embodiment.
Figure 7B:
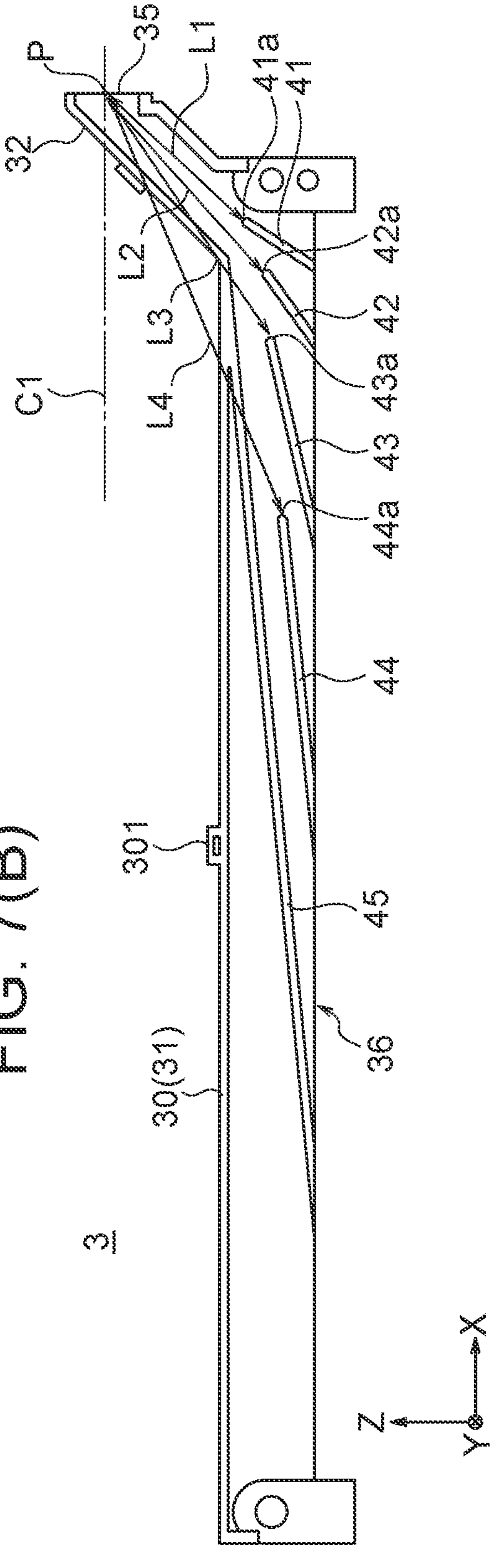
Figure 8:
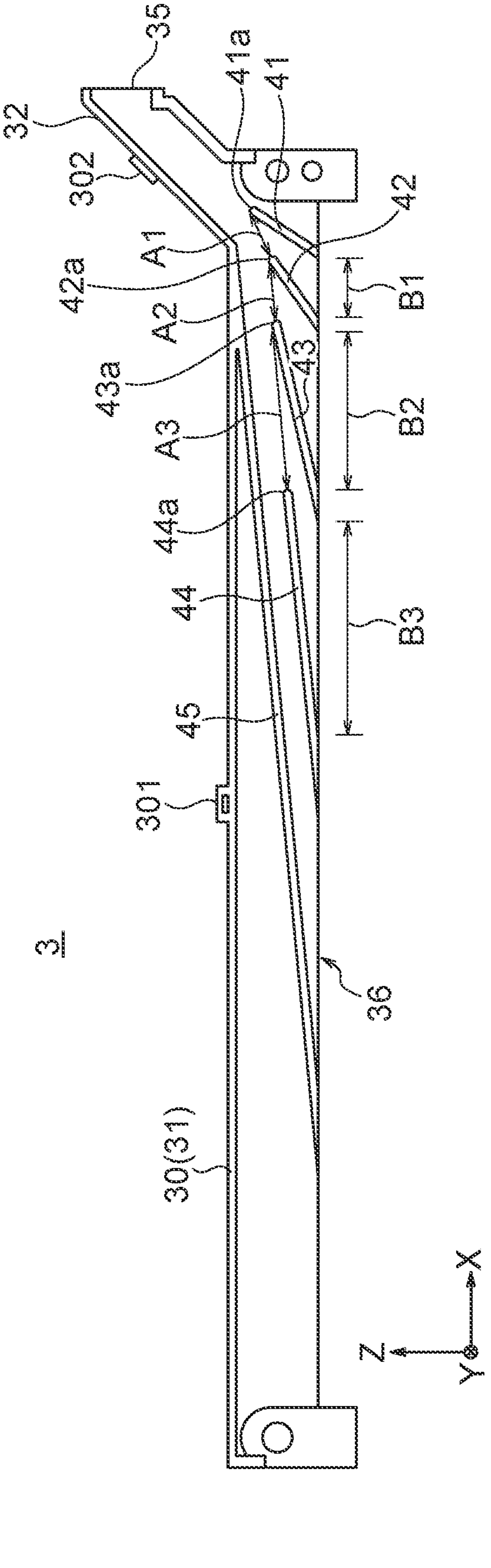
FIG. 8 is a schematic diagram illustrating the duct unit of the exposure unit of the first embodiment.

FIGS. 7(A), 7(B) and 8 are schematic diagrams for explaining the configuration of the main duct D1 and the introduction duct D2.

As illustrated in FIG. 7(A), the ribs 41, 42, 43, and 44 have angles (acute angles) R1, R2, R3, and R4 with respect to the X direction, respectively. The angles R1, R2, R3, and R4 have the relationship of $R1>R2>R3>R4$. That is, the farther the rib is from the inlet 35, the smaller the inclination angle of the rib with respect to the x direction becomes. The distal ends of the ribs 41, 42, 43, and 44 reach the outlet opening 36.

Tips 41*a*, 42*a*, 43*a*, and 44*a* of the ribs 41, 42, 43, and 44 are located at distances T1, T2, T3, and T4 from the pivot axis C1, respectively. The distances T1, T2, T3, and T4 have the relationship of $T1<T2<T3<T4$. That is, the farther the rib is from the inlet opening 35, the lower its height becomes.

As illustrated in FIG. 7(B), the tips 41*a*, 42*a*, 43*a*, and 44*a* of the ribs 41, 42, 43, and 44 are located at distances L1, L2, L3, and L4 from a center P of the inlet opening 35, respectively. These distances L1, L2, L3, and L4 have the relationship of $L1<L2<L3<L4$. That is, the farther the rib is from the inlet opening 35, the longer the distance from the center P of the inlet opening 35 to the tip of the rib becomes.

As illustrated in FIG. 8, an interval between the tips 41*a* and 42*a* of the ribs 41 and 42 (i.e., an opening width) is defined as A1. An interval between the tips 42*a* and 43*a* of the ribs 42 and 43 is defined as A2. An interval between the tips 43*a* and 44*a* of the ribs 43 and 44 is defined as A3. These intervals A1, A2, and A3 satisfy $A1<A2<A3$. That is, the farther the rib is from the inlet opening 35, the wider the interval between the tips of the adjacent ribs (i.e., the opening width) becomes.

An interval between the distal ends of the ribs 41 and 42 (i.e., portions of the ribs reaching the outlet opening 36) is defined as B1. An interval between the distal ends of the ribs 42 and 43 is defined as B2. An interval between the distal ends of the ribs 43 and 44 is defined as B3. These intervals B1, B2, and B3 satisfy $B1<B2<B3$. That is, the farther the rib is from the inlet opening 35, the wider the interval between the distal ends of the adjacent ribs (i.e., the opening width) becomes.

Figure 9:
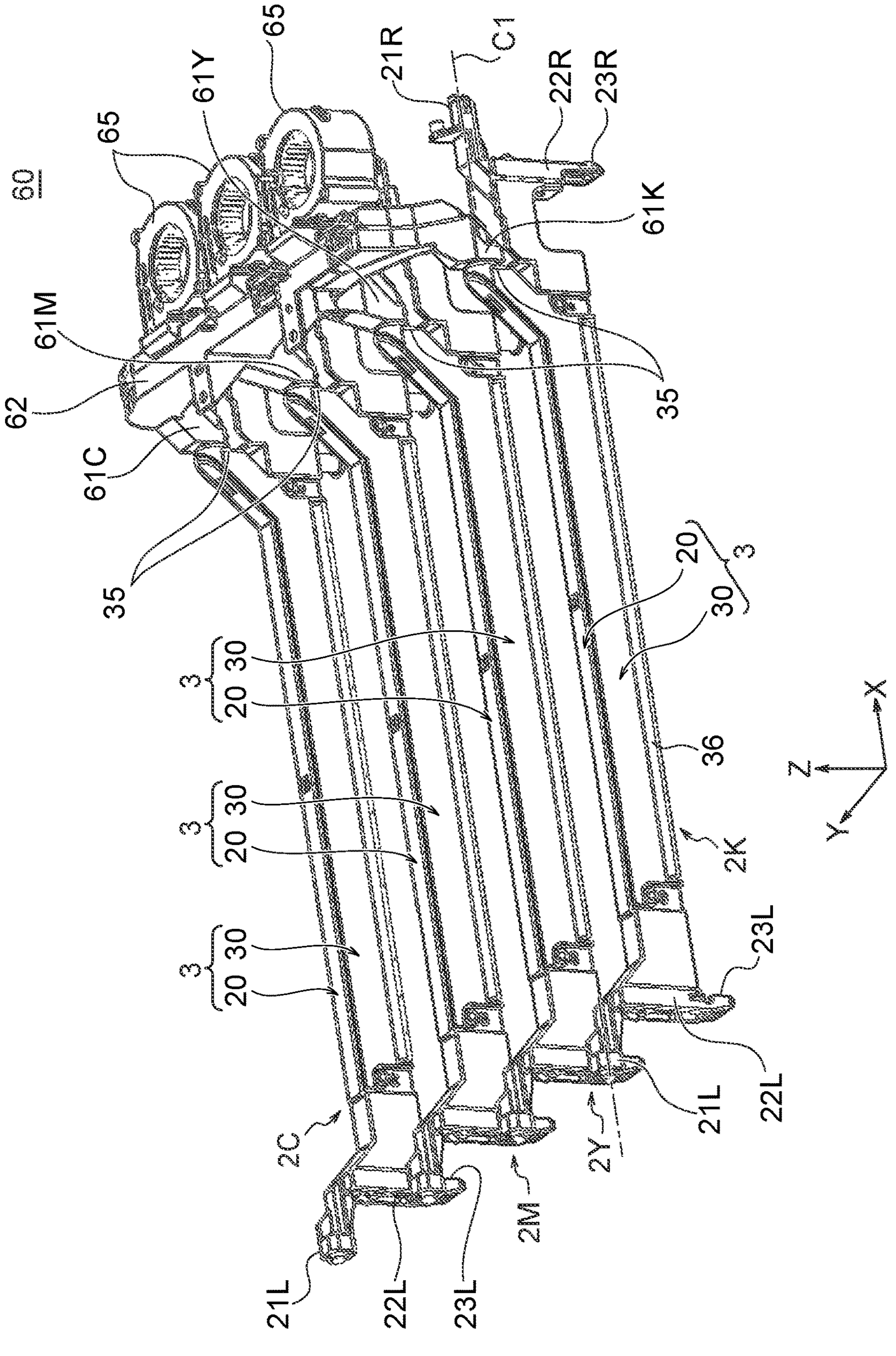
FIG. 9 is a perspective view illustrating the exposure unit and a fan unit of the first embodiment.

FIG. 9 is a perspective view illustrating the arrangement of the exposure units 2K, 2Y, 2M, and 2C and the fan unit 60. The exposure units 2K, 2Y, 2M, and 2C are arranged in the Y direction. Each of the exposure units 2K, 2Y, 2M, and 2C has the head holder 20 and the duct forming body 30 (i.e., the duct unit 3), and the exposure head 50 described above. In FIG. 9, the exposure head 50 (FIG. 2) is omitted.

Figure 10A:
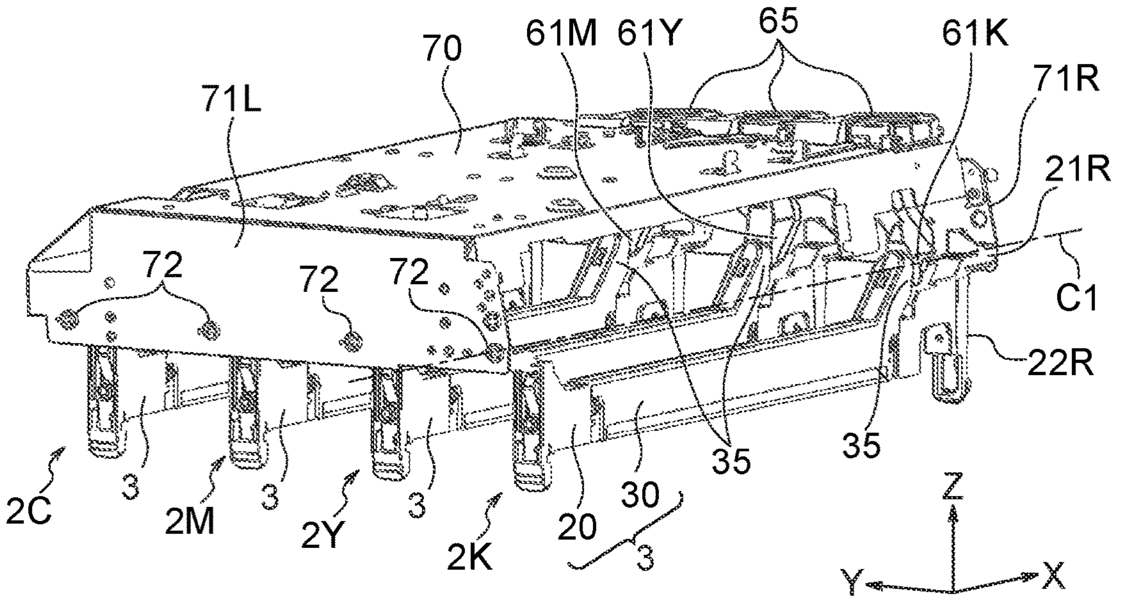
FIG. 10(A) is a perspective view illustrating a top cover of the first embodiment.

The fan unit 60 is disposed inside the top cover 70 (FIG. 10(A)) of the image forming apparatus 1. The fan unit 60 has three fans 65 arranged in the Y direction, a supply duct 62 connected to these fans 65 and extending substantially in the Y direction, and four branch ducts 61K, 61Y, 61M, and 61C branching from the supply duct 62.

The branch ducts 61K, 61Y, 61M, and 61C are connected to the inlet openings 35 of the respective duct units 3 of the exposure units 2K, 2Y, 2M, and 2C, respectively. The air flow generated by the fans 65 flows through the supply duct 62 and the branch ducts 61K, 61Y, 61M, and 61C, and flows into the respective duct units 3 through the inlet openings 35.

Figure 10B:
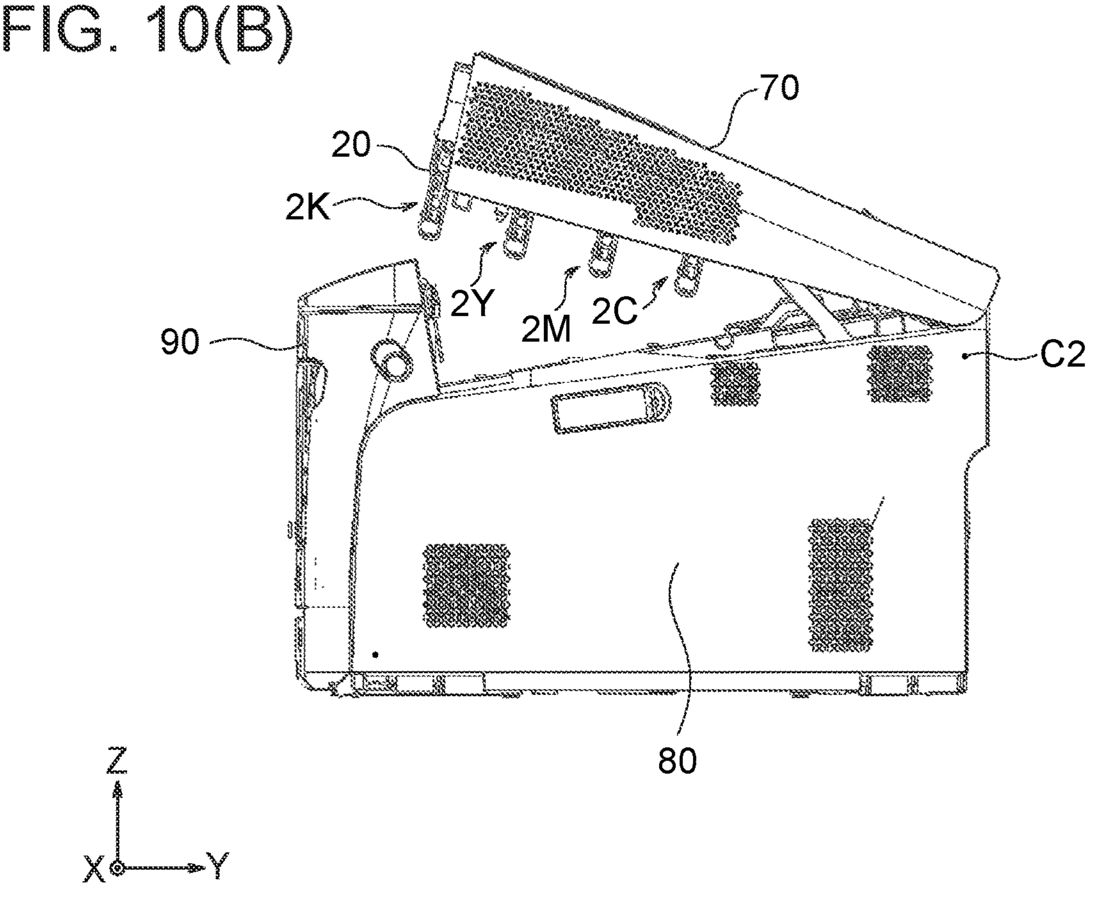
FIG. 10(B) is a side view illustrating the image forming apparatus of the first embodiment.

FIG. 10(A) is a perspective view illustrating the top cover 70, and FIG. 10(B) is a side view illustrating the image forming apparatus 1. As illustrated in FIG. 10(B), the top cover 70 is supported so as to be openable and closable about a pivot axis C2 in the X direction provided in an upper portion of the housing 80. In FIGS. 10(A) and 10(B), the top cover 70 is in the state of being pivoted by a predetermined angle from the closed position (FIG. 1).

As illustrated in FIG. 10(A), the top cover 70 has a pair of side walls 71L and 71R facing each other in the X direction. The side walls 71L and 71R are provided with the shaft support portions 72 that engage the support shafts 21L and 21R (shaft 21L is hidden in FIG. 10(A)) of the head holders 20 of the exposure units 2K, 2Y, 2M, and 2C. By the engagement of the support shafts 21L and 21R with the shaft support portions 72, the exposure units 2K, 2Y, 2M, and 2C are supported in a state of being suspended from the top cover 70.

Figure 11A:
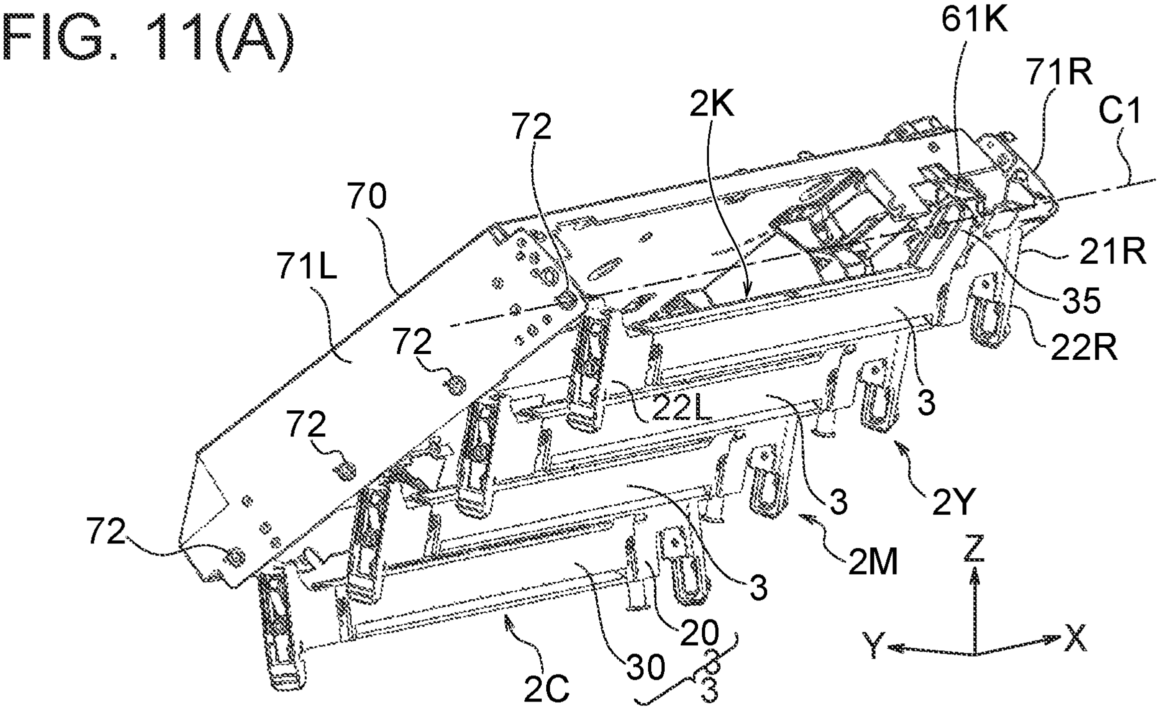
FIG. 11(A) is a perspective view illustrating the top cover of the first embodiment.
Figure 11B:
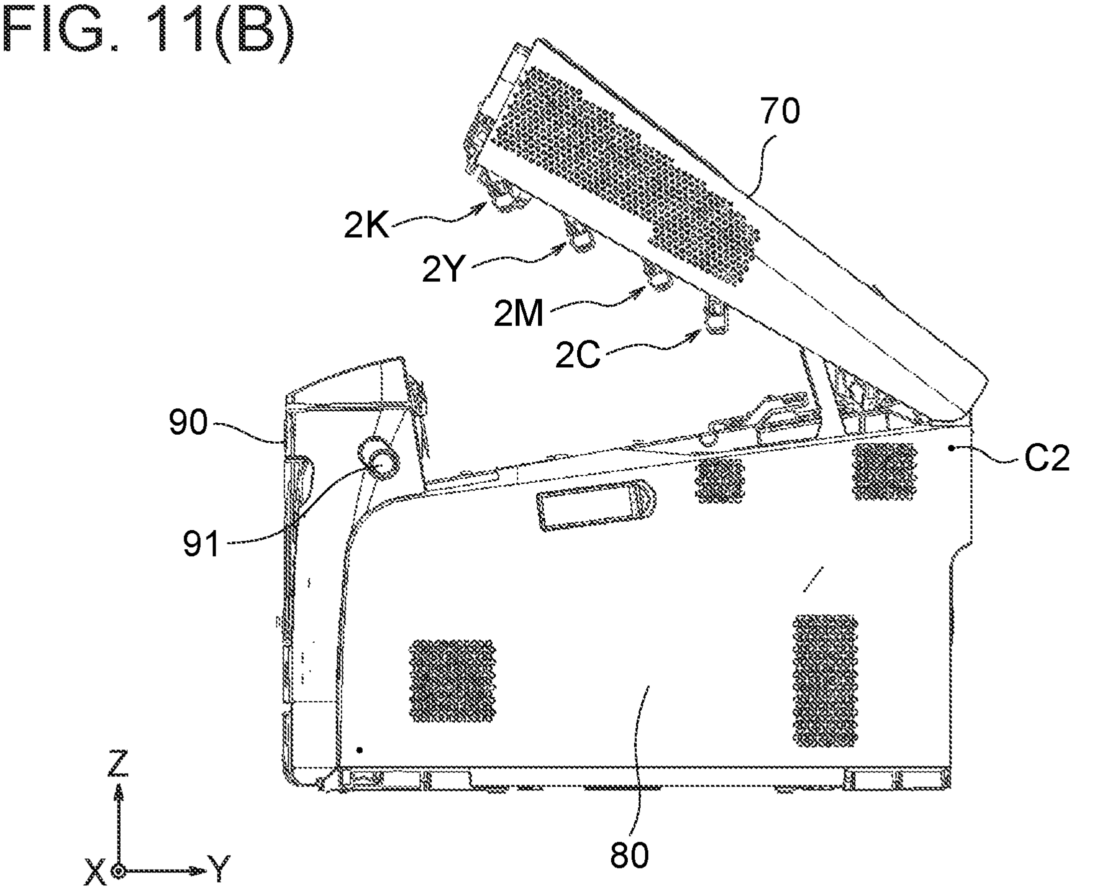
FIG. 11(B) is a side view illustrating the image forming apparatus of the first embodiment.

FIG. 11(A) is a perspective view illustrating the top cover 70, and FIG. 11(B) is a side view illustrating the image forming apparatus 1. In the state illustrated in FIGS. 11(A) and 11(B), the top cover 70 is further pivoted in the opening direction from the position illustrated in FIGS. 10(A) and 10(B).

As illustrated in FIG. 11(A), when the top cover 70 is further pivoted, the exposure units 2K, 2Y, 2M, and 2C pivot about the pivot axis C1 due to their own weight. More specifically, the exposure units 2K, 2Y, 2M, and 2C pivot about the pivot axis C1, so that the extending direction of the arms 22L and 22R of the head holder 20 is oriented substantially in the Z direction.

Since the fan unit 60 (FIG. 9) is fixed to the top cover 70, the relative positions of the exposure units 2K, 2Y, 2M, and 2C with respect to the fan unit 60 change when the exposure units 2K, 2Y, 2M, and 2C pivot about the pivot axis C1.

However, since the inlet opening 35 of each duct unit 3 is located on the pivot axis C1, the connection between the branch duct 61 of the fan unit 60 and the inlet opening 35 of the duct unit 3 is maintained regardless of the pivoting position of the exposure units 2K, 2Y, 2M, and 2C.

Thus, it is not necessary to switch the connection state (i.e., connection or disconnection) between the inlet opening 35 of the duct unit 3 and the branch duct 61 of the fan unit 60 when the top cover 70 is opened or closed.

(Printing Operation of Image Forming Apparatus 1)

Next, the printing operation (image forming operation) of the image forming apparatus 1 will be described with reference to FIGS. 1 and 2. The image forming apparatus 1 starts the printing operation when it receives a printing command and print data from a host device.

First, the pickup roller 112 and the feed roller 113 feed the medium M from the medium feeding tray 111 to the transport path P1 one by one. Further, the transport roller pairs 115 and 118 transport the medium M to the transfer unit 120 along the feeding transport path P1.

In the transfer unit 120, the drive roller 123 rotates to cause the transfer belt 122 to travel. The transfer belt 122 adsorbs and holds the medium M and transports the medium M. The medium M passes through the image forming units 10K, 10Y, 10M, and 10C in this order.

In each of the image forming units 10K, 10Y, 10M, and 10C, a toner image of each color is formed. That is, the charging voltage, the developing voltage, and the supply voltage are applied to the charging roller 12, the developing roller 13, and the supply roller 14 of each image forming unit 10, respectively.

The photosensitive drum 11 rotates, and the charging roller 12, the developing roller 13, and the supply roller 14 also rotate along with the rotation of the photosensitive drum 11. The charging roller 12 uniformly charges the surface of the photosensitive drum 11. The exposure unit 2 emits light based on image data and exposes the uniformly charged surface of the photosensitive drum 11 with light to form an electrostatic latent image.

The toner is supplied to the developing roller 13 by the supply roller 14, and a thin toner layer is formed on the surface of the developing roller 13. The thickness of the toner layer is regulated by the developing blade 15. The electrostatic latent image formed on the surface of the photosensitive drum 11 is developed by the toner on the developing roller 13 to form a toner image. The toner image on the photosensitive drum 11 is transferred to the medium M on the transfer belt 122 when the transfer voltage is applied to the transfer roller 121. The toner not transferred to the medium M is scraped off by the cleaning member 17.

The toner images of the respective colors formed in the respective image forming units 10K, 10Y, 10M, and 10C are sequentially transferred to the medium M and overlap each other. The medium M with the toner images of the respective colors transferred thereon is further transported by the transfer belt 122 to reach the fixing device 130.

In the fixing device 130, the toner image on the medium M is heated and pressurized by the heating roller 131 and the pressure roller 132, so that the toner image is fixed onto the medium M.

The medium M on which the toner image is fixed is ejected to the outside of the image forming apparatus 1 by the ejection rollers 141 and 142, and is placed on the stacker portion 143. Thus, the formation of a color image on the medium M is completed.

In the case of double-sided printing, the medium M with the toner image fixed on the first surface by the fixing device 130 is once guided into the retreat path P4 by the switching guide 145 and the transport rollers 151 and 152, then fed from the retreat path P4 in the opposite direction, and transported through the return transport path P5 by the transport rollers 153 to 156. The medium M passes through the roller pair composed of the transport roller 157 and the registration roller 116 to reach the feeding transport path P1, and is transported to the transfer unit 120 by the transport roller 118.

Thereafter, the toner images are transferred to the second surface of the medium M by the image forming units 10K, 10Y, 10M, and 10C and the transfer unit 120, and then fixed to the second surface of the medium M in the fixing device 130. The medium M with the toner image fixed thereon is ejected to the outside of the image forming apparatus 1 by the ejection rollers 141 and 142 and is placed on the stacker portion 143.

(Cooling Action of Image Forming Unit 10 by Ducts D1 and D2)

In the above printing operation, the developing blade 15 is pressed against the surface of the developing roller 13 in each image forming unit 10, and thus heat is generated by friction.

In the first embodiment, the air flow generated by the fans 65 of the fan unit 60 flows in the duct unit 3 of each exposure unit through the inlet opening 35 and is blown on the image forming unit 10 (particularly, the vicinity of the developing blade 15) through the outlet opening 36, as indicated by arrow F in FIG. 2. Thus, the heat generated by the developing blade 15 can be dissipated, and the image forming unit 10 can be cooled.

In particular, since the outlet opening 36 of the duct unit 3 faces the layer regulating unit 100 which includes the developing blade 15 and the blade holder 101, the heat generated by the developing blade 15 can be dissipated by blowing the air on the blade holder 101.

Since the inlet opening 35 of each duct unit 3 is located on the pivot axis C1, the connection between the branch duct 61 of the fan unit 60 and the inlet opening 35 of the duct unit 3 is maintained even when the exposure unit 2 is pivoted about the pivot axis C1 when the top cover 70 is opened or closed. Thus, there is no need to switch the connection state between the branch duct 61 of the fan unit 60 and the inlet opening 35 of the duct unit 3 when the top cover 70 is opened or closed.

As illustrated in FIG. 6, the partition plate 45 extends in such a manner that the air discharged from the outlet opening 36 spreads over an entire cooling target range of the developing blade 15 (i.e., range denoted by reference character W1 in FIG. 6). Thus, the cooling target range of the developing blade 15 can be efficiently cooled.

The main duct D1 is provided with the ribs 41, 42, 43, and 44, and the angles (acute angles) R1, R2, R3, and R4 of the ribs 41, 42, 43, and 44 with respect to the X direction have the relationship of R1>R2>R3>R4 (see FIG. 7(A)). Thus, the air can be blown on the image forming unit 10 not only on the side close to the inlet opening 35, but also on the side far from the inlet opening 35. As a result, the image forming unit 10 can be cooled uniformly in the X direction.

The distances L1, L2, L3, and L4 from the center P of the inlet opening 35 to tips 41a, 42a, 43a, and 44a of the ribs 41, 42, 43, and 44 have the relationship of L1<L2<L3<L4 (see FIG. 7(B)). Therefore, as compared to a case where the tips 41a, 42a, 43a, and 44a of the ribs 41, 42, 43, and 44 are arranged along the same circular circumference about the center P, the distance between adjacent tips can be widened, and the pressure drop can be reduced.

In addition, the air having flowed into the main duct D1 is branched at the respective tips 41a, 42a, 43a, and 44a of the ribs 41, 42, 43, and 44, and the positions where the air is branched can be differentiated due to the above relationship of L1<L2<L3<L4. Thus, the air flow passing through between the ribs 41, 42, 43, and 44 can be stabilized.

The interval A1 between the tips 41a and 42a of the ribs 41 and 42, the interval A2 between the tips 42a and 43a of the ribs 42 and 43, and the interval A3 between the tips 43a and 44a of the ribs 43 and 44 satisfy A1<A2<A3 (see FIG. 8). In the main duct D1, the closer to the inlet opening 35 the rib is located, the faster the air speed at the rib becomes. However, the farther the rib is from the inlet opening 35, the wider the interval between the tips of the adjacent ribs becomes due to the above relationship A1<A2<A3. Thus, the air can be blown uniformly on the image forming unit 10.

Since the introduction duct D2 is inclined from the inlet opening 35 toward the outlet opening 36, the air having flowed in through the inlet opening 35 can be directed to the outlet opening 36 while minimizing the decrease in the speed of the air. As a result, the image forming unit 10 can be cooled more efficiently.

Since the introduction duct D2 extends from the inlet opening 35 to the end of the outlet opening 36 in the +X direction, the air is discharged at a high speed in an area near the end of the outlet opening 36 in the +X direction. In an area far from the end of the outlet opening 36 in the +X direction, the flow rate of the air can be secured by widening the interval of the ribs as described above. With these effects, the image forming unit 10 can be cooled uniformly in the X direction.

Although it is the most desirable that the duct unit 3 has all of these features, a certain effect can be achieved even when the duct unit 3 has only one of the features. For example, only the feature that the angle (acute angle) R1 formed by the rib 41 (first rib) with respect to the X direction is larger than the angle (acute angle) R2 formed by the rib 42 (second rib) with respect to the X direction can achieve the effect of uniformly blowing the air on the image forming unit 10 to uniformly cool the image forming unit 10.

Although an example in which the main duct D1 has the ribs 41, 42, 43, and 44 has been described here, it is sufficient that the main duct D1 has at least one rib. Further, the side wall 31a of the duct forming body 30 may be eliminated, the ducts D1 and D2 may be formed between the unit casing 18 of the image forming unit 10 and the duct unit 3, and the ribs 41 to 44 may be provided on the head holder 20.

Effects of Embodiment

As described above, the image forming apparatus 1 of the first embodiment includes the image forming unit 10 having the photosensitive drum (image bearing body) 11, and the exposure unit 2 having the exposure head (exposure portion) 50 that emits light to expose the photosensitive drum 11 to form a latent image. The exposure unit 2 has the duct unit 3 extending in the X direction. The duct unit 3 has the inlet opening 35 and the outlet opening 36. The exposure unit 2 is provided pivotably about the pivot axis C1, which is the virtual straight line passing through the inlet opening 35.

Since the air is discharged from the outlet opening 36 of the duct unit 3, the image forming unit 10 can be cooled, and an increase in the temperature of the image forming unit 10 can be suppressed. Since the inlet opening 35 of each duct unit 3 is located on the pivot axis C1, the connection between the branch duct 61 of the fan unit 60 and the inlet opening 35 of the duct unit 3 is maintained even when the exposure unit 2 is pivoted about the pivot axis C1 upon opening and closing of the top cover 70. Thus, there is no need to switch the connection state between the branch duct 61 of the fan unit 60 and the inlet opening 35 of the duct unit 3 when the top cover 70 is opened or closed.

The main duct D1 has the rib 41 and the rib 42 that is farther from the inlet opening 35 than the rib 41. The angle (acute angle) R1 between the rib 41 (first rib) and the X direction is larger than the angle (acute angle) R2 between the rib 42 (second rib) and the X direction. Thus, the air can be blown also on the area in the image forming unit 10 that is located on the side far from the inlet opening 35. As a result, the image forming unit 10 can be cooled uniformly in the X direction.

Further, the distance L2 from the inlet opening 35 to the rib 42 is longer than the distance L1 from the inlet opening 35 to the rib 41. Thus, as compared to when these distances are equal, the interval between the tips 41a and 42a of the ribs 41 and 42 can be widened, and thus pressure drop can be reduced.

The interval A1 between the tip 41a of the rib 41 and the tip 42a of the rib 42 and the interval A2 between the tip 42a of the rib 42 and the tip 43a of the rib 43 satisfy A1<A2. Thus, the farther the tip of the rib is from the inlet opening 35 (the lower the air speed is), the wider the interval between the tips of the adjacent ribs becomes. Thus, the air can be blown uniformly on the image forming unit 10.

The main duct D1 has the rib 44 that is farther from the inlet opening 35 than the rib 43, and the interval A3 between the tip 43a of the rib 43 and the tip 44a of the rib 44 satisfies A2<A3. Thus, the farther the rib is from the inlet opening 35 (the lower the air speed is), the wider the interval between the tips of the adjacent ribs becomes. Thus, the air can be blown uniformly on the image forming unit 10.

The duct unit 3 has the introduction duct D2 (second duct) that connects the inlet opening 35 with the main duct D1, and the introduction duct D2 extends from the inlet opening 35 toward the outlet opening 36 while being inclined relative to the X direction. Thus, the air having flowed in through the inlet opening 35 can be directed to the outlet opening 36 while minimizing decrease in the speed of the air. Thus, the image forming unit 10 can be cooled more efficiently.

The inlet opening 35 is disposed on the end side of the duct unit 3 in the +X direction (one end side in the longitudinal direction), and the introduction duct D2 extends from the inlet opening 35 toward the same end side of the outlet opening 36. Thus, the air is discharged at a high speed in the area near the end of the outlet opening 36 in the +X direction. Further, the interval between the tips of the ribs is widened in the area far from the end of the outlet opening 36 in the +X direction as described above, and thus the flow rate in the area can be secured.

Since the outlet opening 36 of the duct unit 3 is disposed so as to face the layer regulating unit 100, the heat generated by the developing blade 15 can be efficiently dissipated by the air blown on from the outlet opening 36.

In addition, since the fan unit 60 having at least one fan 65 is provided to feed the air into the inlet opening 35 of the duct unit 3, a sufficient volume of the air can be blown on the image forming unit 10, and thus cooling efficiency can be improved.

Modification

Figures 12A, 12B:
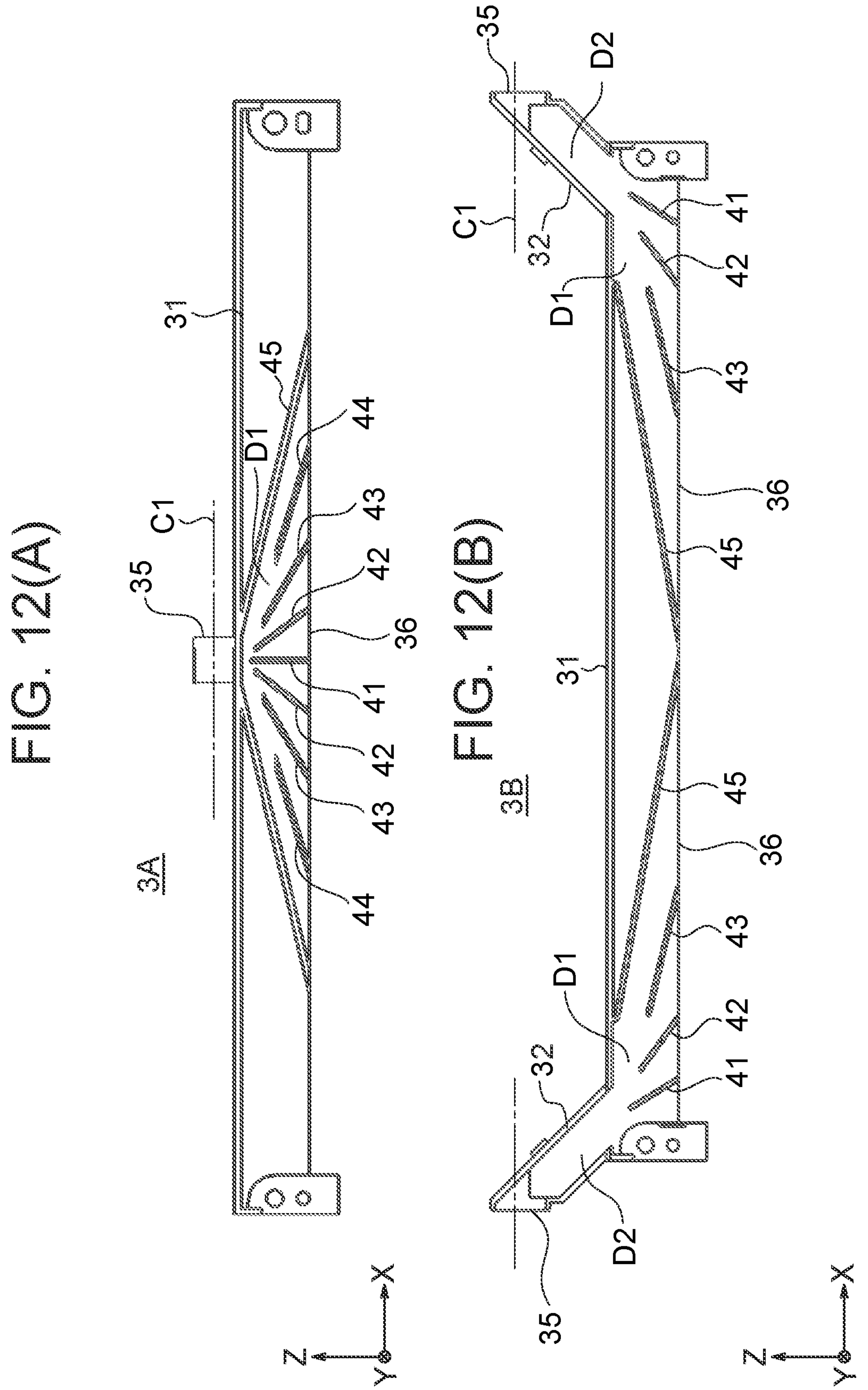
FIGS. 12(A) and 12(B) are schematic diagrams illustrating duct units of modifications of the first embodiment.

FIGS. 12(A) and 12(B) are diagrams illustrating duct units 3A and 3B of modifications of the first embodiment. In the modification illustrated in FIG. 12(A), the inlet opening 35 is disposed at the center of the duct unit 3A in the X direction. The inlet opening 35 is directly connected to the main duct D1 of the duct unit 3A, and the duct unit 3A is not provided with the introduction duct D2.

Ribs 41, 42, 43, and 44 are disposed in the main duct D1 of the duct unit 3A. The rib 41 is disposed at the center of the main duct D1 in the X direction. The ribs 42, 43, and 44 are disposed on each side of the rib 41 in the X direction.

The ribs 42, 43, and 44 are disposed in this order from the center toward each end in the X direction of the main duct D1. Each of the ribs 42, 43, and 44 is inclined so as to be displaced in the −Z direction as a distance from the inlet opening 35 in the X direction increases.

Two partition plates 45 are disposed on both sides of a group of the ribs 41 to 44 in the X direction. The two partition plates 45 each extend in such a manner that the air having flowed in through the inlet opening 35 spreads over the entire cooling target range. Each partition plate 45 extends while being inclined so as to be displaced in the −Z direction as a distance from the inlet opening 35 in the X direction increases.

In the duct unit 3A, the air having flowed in through the inlet opening 35 disposed at the center of the main duct D1 is guided by the ribs 41 to 44 so as to spread to both sides of the duct unit 3A in the X direction and is then discharged from the outlet opening 36. Thus, the image forming unit 10 can be cooled uniformly in the X direction.

An example in which the duct unit 3A has the ribs 41, 42, 43, and 44 has been described here, but it is sufficient that the duct unit 3A has at least one rib that guides the air having flowed in through the inlet opening 35 so that the air spreads in the X direction.

In the modification illustrated in FIG. 12(B), the inlet openings 35 are disposed at both ends of a duct unit 3B in the X direction. In the duct unit 3B, the introduction ducts D2 are provided on both sides of the main duct D1 in the X direction.

The main duct D1 of the duct unit 3B has ribs 41, 42, and 43 on each side of the center of the main duct D1 in the X direction. More specifically, one ribs 41, 42, and 43 are disposed in this order from the end in the −X direction to the center of the main portion 31. Meanwhile, the other ribs 41, 42, and 43 are disposed in this order from the end in the +X direction to the center of the main portion 31. Each of the ribs 41, 42, and 43 is inclined so as to be displaced in the −Z direction as the distance from the inlet opening 35 in the X direction increases.

The two partition plates 45 are disposed on both sides of the center of the main duct D1 in the X direction. Each partition plate 45 extends from each end toward the center of the main duct D1 in the X direction. Each partition plate 45 extends while being inclined so as to be displaced in the −Z direction as the distance to the center of the main duct D1 in the X direction decreases.

In the duct unit 3B, the air having flowed in through the inlet openings 35 disposed at both ends of the main duct D1 in the X direction is guided by the ribs 41 to 43 so as to spread toward the center of the main duct D1 in the X direction and is then discharged from the outlet opening 36. Thus, the image forming unit 10 can be cooled uniformly in the X direction.

A case where the duct unit 3B has the ribs 41, 42, and 43 has been described here. However, it is sufficient that the duct unit 3B has at least one rib that guides the air having flowed in through the inlet openings 35 so that the air spreads toward the center of the duct unit in the X direction.

Second Embodiment

Figure 13:
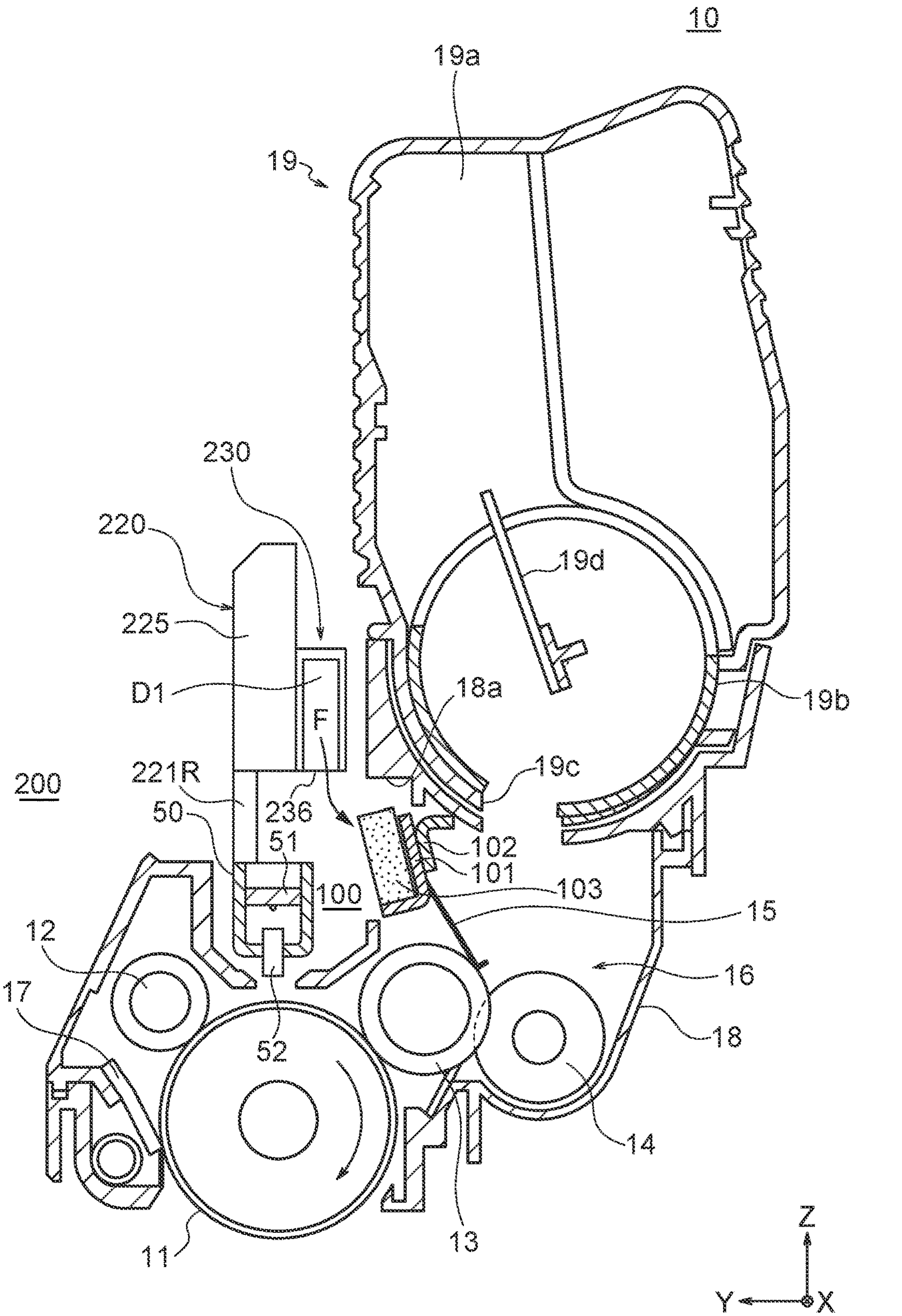
FIG. 13 is a sectional view illustrating an image forming unit and an exposure unit of a second embodiment.

FIG. 13 is a sectional view illustrating an exposure unit 200 and an image forming unit 10 of a second embodiment. The exposure unit 200 of the second embodiment has a head holder 220 and a duct unit 230 (i.e., an air duct or a duct body). The duct unit 230 alone constitutes ducts D1 and D2. The air discharged from the duct unit 230 is blown on at least one heat sink 103 of the image forming unit 10.

The duct unit 230 is fixed to the image forming unit 10 side (i.e., in the −Y direction) of the head holder 220 and faces the image forming unit 10. The exposure head 50 is held at the end of the head holder 220 in the −Z direction so as to face the photosensitive drum 11.

Figure 14:
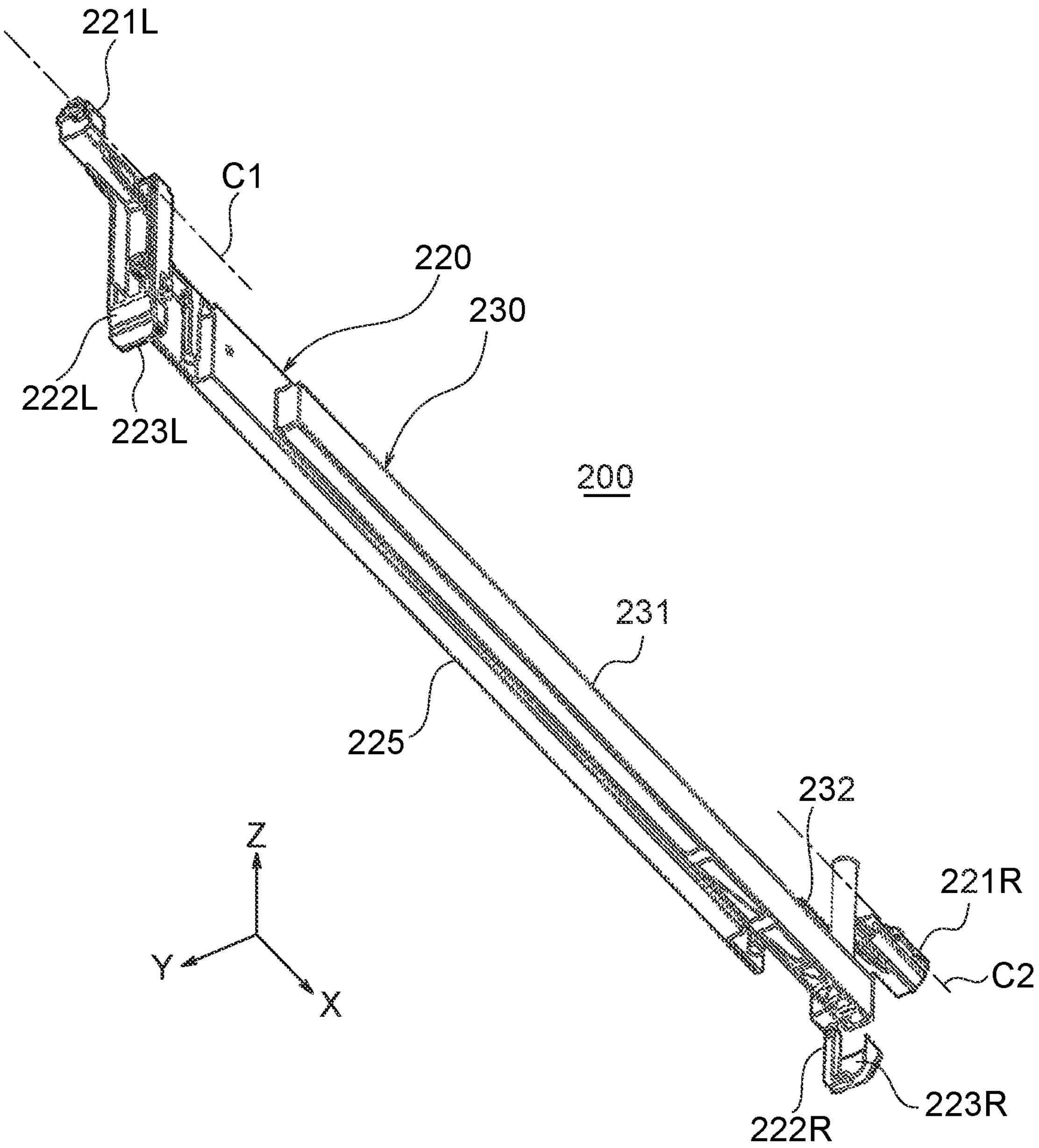
FIG. 14 is a perspective view illustrating a duct unit of the second embodiment.

FIG. 14 is a perspective view illustrating the exposure unit 200 of the second embodiment. The head holder 220 has support shafts 221L and 221R at both ends thereof in the X direction. The support shafts 221L and 221R engage the shaft support portions 72 (see FIG. 10(A)) of the top cover 70. By the engagement of the support shafts 221L and 221R and the shaft support portions 72, the exposure unit 200 is supported pivotably about the pivot axis C1 in the X direction.

The head holder 220 has arms 222L and 222R at both ends thereof in the X direction. The arms 222L and 222R extend downward, i.e., in the −Z direction, from the support shafts 221L and 221R, respectively. A base body 225 that is elongated in the X direction is formed between the arms 222L and 222R of the head holder 220.

Holding grooves 223L and 223R are formed at the ends of the arms 222L and 222R in the −Z direction, respectively. The holding grooves 223L and 223R face each other in the X direction. Both ends of the exposure head 50 (FIG. 13) in the X direction are held in the holding grooves 223L and 223R. Incidentally, in FIG. 14, the exposure head 50 is omitted.

The duct unit 230 is a longitudinal member elongated in the X direction and is fixed to the −Y side of the head holder 220. The duct unit 230 and the head holder 220 may be fixed by using screws or adhesion.

Figure 15:
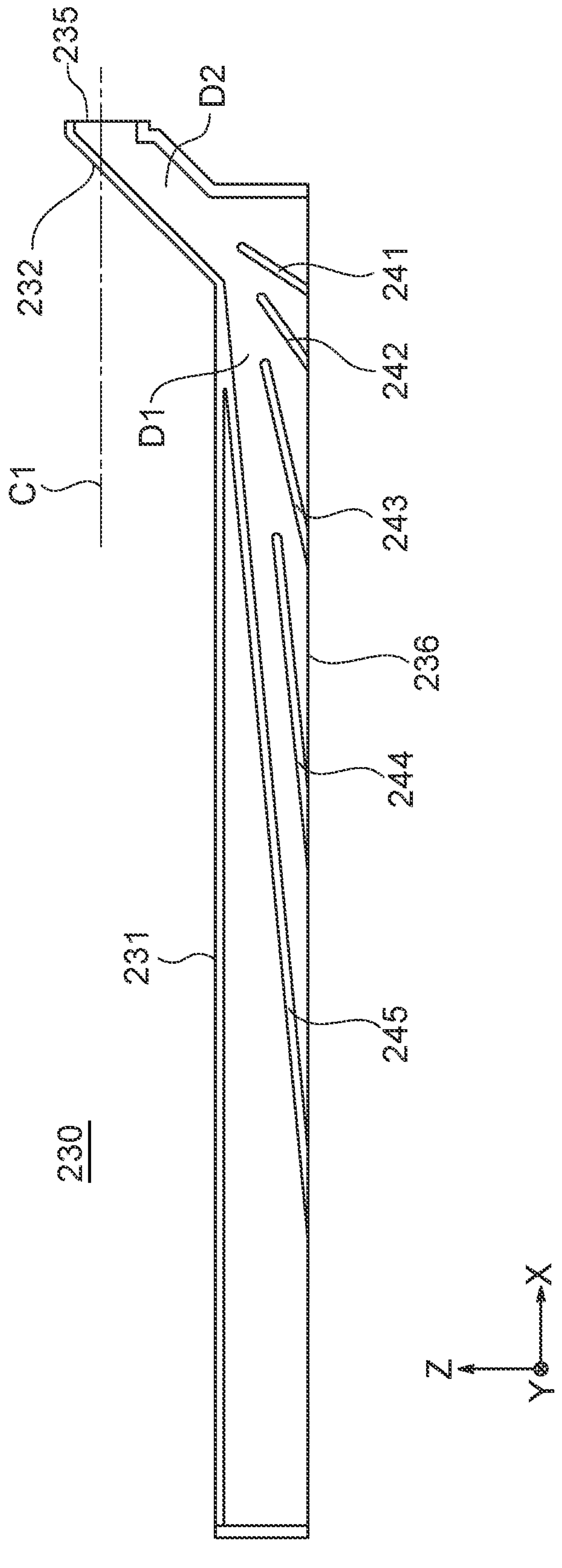
FIG. 15 is a schematic diagram illustrating the duct unit of the second embodiment.

FIG. 15 is a sectional view illustrating the duct unit 230. The duct unit 230 has a main portion 231 extending in the X direction and an inclined portion 232 formed at an end of the main portion 231 in the +X direction. The inclined portion 232 is inclined so as to be displaced in the +Z direction as it goes in the +X direction.

The main duct D1 is formed inside the main portion 231. The introduction duct D2 is formed inside the inclined portion 232. A partition plate 245 that is the same as the partition plate 45 of the first embodiment is formed in the main portion 231. The main duct D1 is a region on the introduction duct D2 side with respect to the partition plate 245.

An inlet opening 235 as a first opening is formed at the end of the inclined portion 232 in the +X direction. The inlet opening 235 is located on the pivot axis C1. An end surface of the main portion 231 oriented in the −Z direction serves as an outlet opening 236 as the second opening.

The main duct D1 is provided with ribs 241, 242, 243, and 244. The ribs 241, 242, 243, and 244 are arranged in this order from the side closer to the inlet opening 235. The ribs 241, 242, 243, and 244 are also referred to as a first rib, a second rib, a third rib, and a fourth rib, respectively.

The arrangement of the ribs 241, 242, 243, and 244 is the same as that of the ribs 41, 42, 43, and 44 (FIG. 8) of the first embodiment. The inlet opening 235, the ribs 241 to 244, and the partition plate 245 may be arranged as illustrated in the modifications of FIGS. 12(A) and 12(B).

The air from the fans 65 of the fan unit 60 (FIG. 9) described in the first embodiment flows to the inlet opening 235 of the duct unit 230. The air having flowed into the duct unit 230 through the inlet opening 235 flows into the main duct D1 through the introduction duct D2, and the air is then branched by the ribs 241, 242, 243, and 244 and discharged from the outlet opening 236.

In the second embodiment, as illustrated in FIG. 13, the air from the duct unit 230 is blown on the heat sinks 103 mounted on the blade holder 101 of the image forming unit 10.

Figure 16:
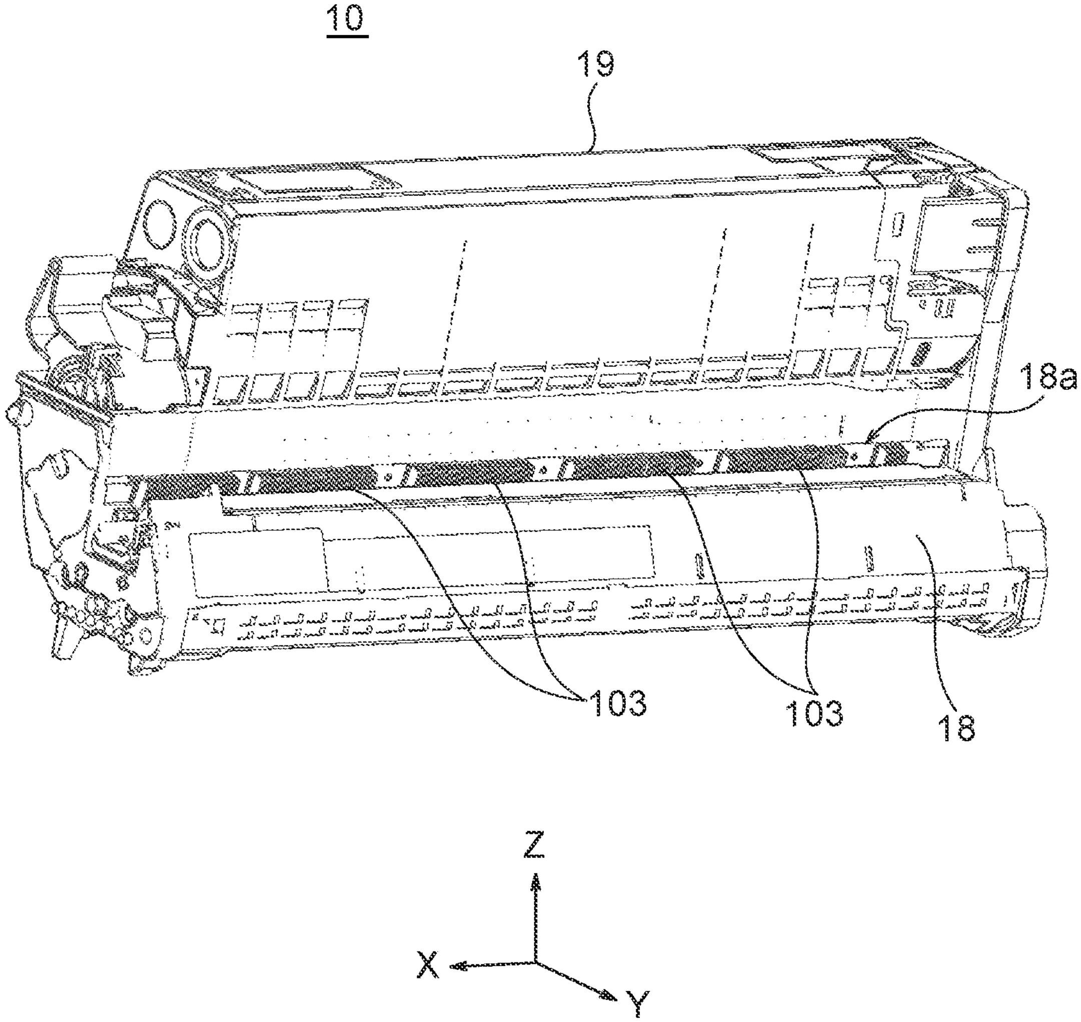
FIG. 16 is a perspective view illustrating the image forming unit of the second embodiment.

FIG. 16 is a perspective view illustrating the image forming unit 10. As illustrated in FIG. 16, an opening 18*a* is formed on the duct unit 230 side (i.e., in the +Y direction) of the unit casing 18 of the image forming unit 10. The heat sinks 103 are exposed through the opening 18*a*.

Heat generated by the contact of the developing blade 15 with the developing roller 13 is transferred to the heat sinks 103 via the blade holder 101. The air discharged from the outlet opening 236 of the duct unit 230 is blown on the heat sinks 103 of the image forming unit 10. Thus, the heat generated by the developing blade 15 can be dissipated, and the image forming unit 10 can be cooled.

The heat sinks 103 are provided on the blade holder 101 in this example, but they may be provided at a portion of the image forming unit 10 other than the blade holder 101 so that the air from the duct unit 230 is blown on the heat sinks 103.

The duct unit 230 alone constitutes the ducts D1 and D2 in this example. However, the side wall of the duct unit 230 on the image forming unit 10 side may be eliminated, and the ducts D1 and D2 may be formed between the duct unit 230 and the wall surface of the image forming unit 10.

As described above, in the second embodiment, the air discharged from the duct unit 230 is blown on the heat sinks 103 of the image forming unit 10. Thus, it is possible to more effectively cool the image forming unit 10.

Incidentally, the heat sink 103 (FIG. 3) described in the second embodiment may be provided on the image forming unit 10 of the first embodiment.

Modifications

Figure 17A:
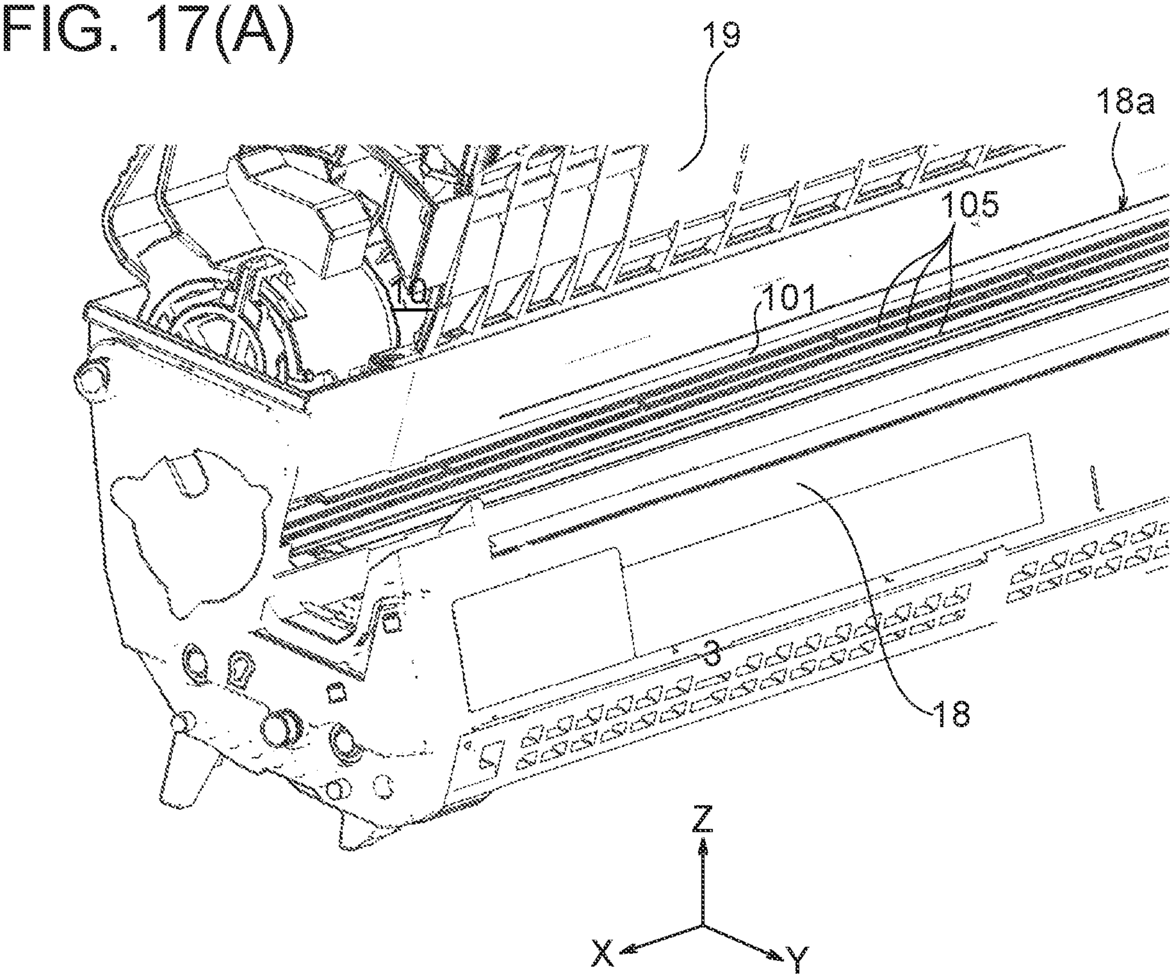
FIG. 17(A) is a perspective view illustrating an image forming unit.

FIG. 17(A) is a perspective view illustrating an image forming unit 10 of a modification of the second embodiment. In the modification illustrated in FIG. 17(A), a blade holder 101 of the image forming unit 10 is not provided with the heat sinks 103 (FIG. 13), but instead is provided with concaves or convexes.

A surface of the blade holder 101 in the +Y direction (i.e., a surface facing the duct unit 230) is exposed from the opening 18*a* of the unit casing 18 of the image forming unit 10. A plurality of convex portions 105 are formed on the surface of the blade holder 101 in the +Y direction.

Figure 17B:
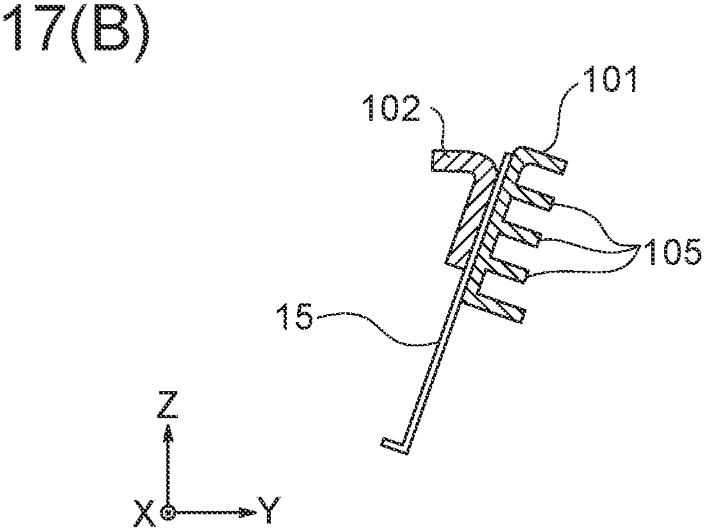
FIG. 17(B) is a sectional view illustrating a blade holder in a modification of the second embodiment.

FIG. 17(B) is a schematic diagram illustrating the developing blade 15 and the blade holder 101 which are illustrated in FIG. 17(A), and their surroundings. The convex portions 105 formed on the developing blade 15 function as heat dissipation fins. When air from the duct unit 230 is blown on the convex portions 105, the heat generated by the developing blade 15 is efficiently dissipated through the blade holder 101.

Figure 18:
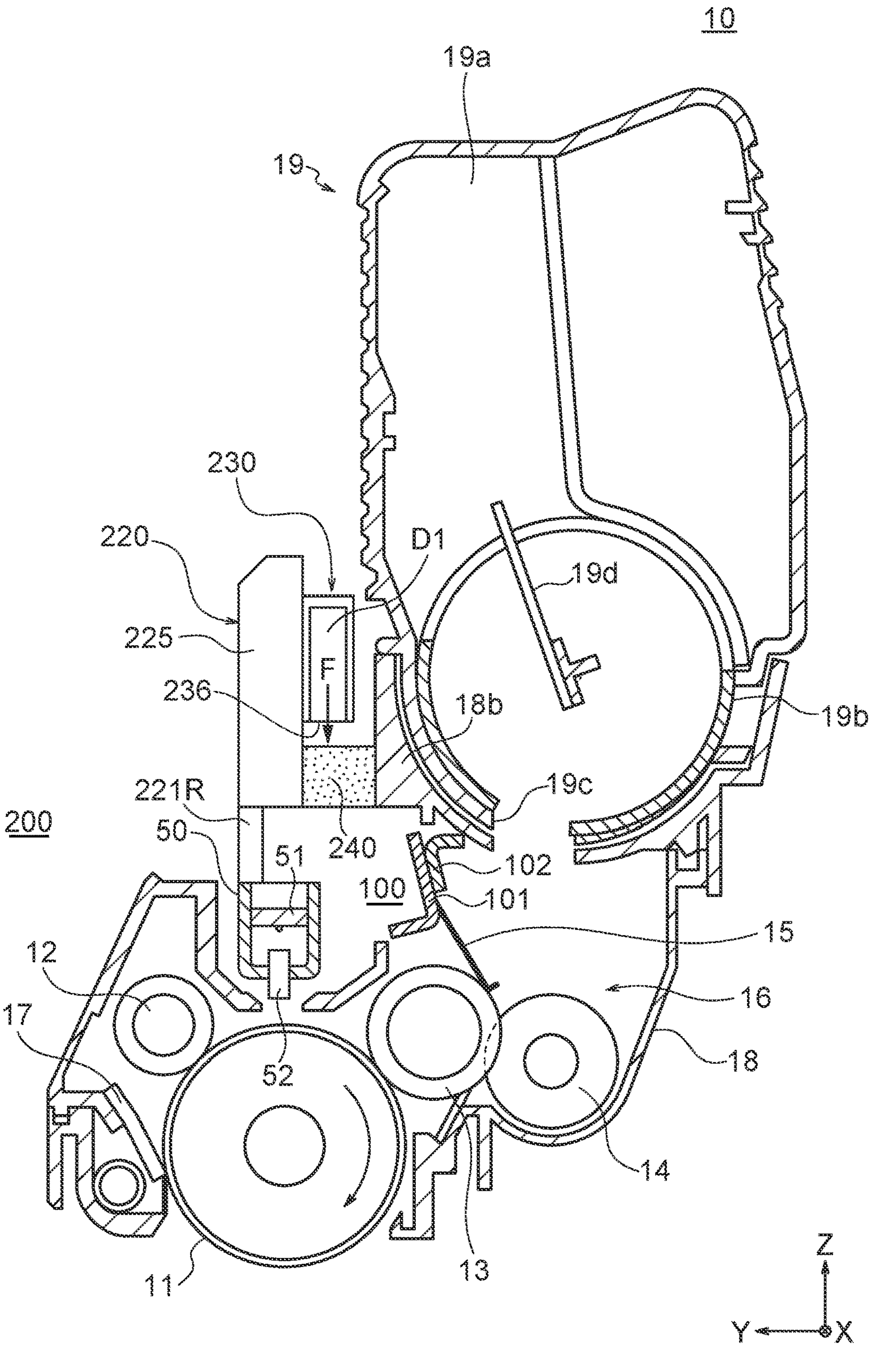
FIG. 18 is a sectional view illustrating an image forming unit and an exposure unit of another modification of the second embodiment.

FIG. 18 is a sectional view illustrating an image forming unit 10 and an exposure unit 200 of another modification of the second embodiment. In the second embodiment described above, the image forming unit 10 (for example, the blade holder 101) is provided with at least one heat sink 103. In contrast, in the modification illustrated in FIG. 18, the exposure unit 200 is provided with at least one heat sink 240.

Specifically, the heat sink 240 is mounted on the base body 225 of the head holder 220. The duct unit 230 is provided so that the outlet opening 236 faces the heat sink 240.

The heat sink 240 is in contact with a wall portion 18*b* (wall surface) of the unit casing 18 or the blade holder 101 in the image forming unit 10.

Also in this case, the heat generated by the developing blade 15 is transferred to the heat sink 240 via the unit casing 18, and then dissipated by the air discharged from the duct unit 230 and blown on the heat sink 240.

Figure 19:
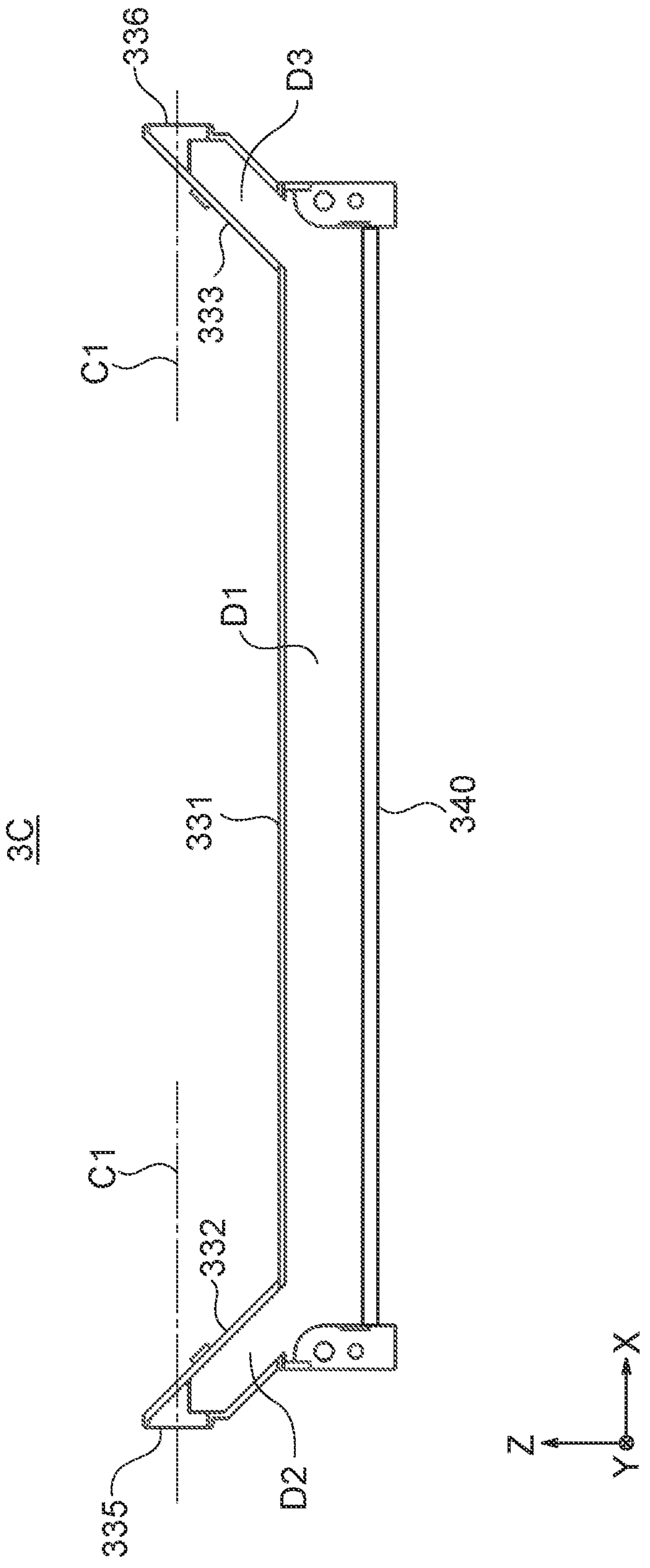
FIG. 19 is a schematic diagram illustrating a duct unit of another modification of the second embodiment.

FIG. 19 is a diagram illustrating still another modification of the second embodiment. A duct unit 3C illustrated in FIG. 19 has an inlet opening 335 at an end in the longitudinal direction (an end in the −X direction) of the duct unit 3C, and an outlet opening 336 at the other end in the longitudinal direction (an end in the +X direction) of the duct unit 3C. Both the inlet opening 335 and the outlet opening 336 are located on the pivot axis C1.

The duct unit 3C has, for example, a main portion 331 extending in the X direction, an inclined portion 332 formed on the −X side of the main portion 331, and an inclined portion 333 formed on the +X side of the main portion 331. The inlet opening 335 is provided on the inclined portion 332, while the outlet opening 336 is provided on the inclined portion 333.

A main duct D1 is formed inside the main portion 331 of the duct unit 3C, an introduction duct D2 is formed inside the inclined portion 332, and a discharge duct D3 is formed inside the inclined portion 333. No ribs are provided in the main duct D1.

The wall surface on the −Z side (bottom side in FIG. 19) of the main duct D1 is constituted by a heat sink 340. The heat sink 340 is in contact with the wall portion 18*b* (wall surface) of the unit casing 18 of the image forming unit 10 illustrated in FIG. 18 or with the blade holder 101.

The air having flowed into the duct unit 3C through the inlet opening 335 passes through the main duct D1 via the introduction duct D2, takes heat from the heat sink 340, and is discharged from the outlet opening 336 through the discharge duct D3. Thus, the heat of the image forming unit 10 can be dissipated through the heat sink 340.

As described above, both the inlet opening 335 and the outlet opening 336 are located on the pivot axis C1. Thus, even when the exposure unit 2 pivots about the pivot axis C1, the connection between the inlet opening 335 and the branch duct 61 of the fan unit 60 (FIG. 9) is maintained, and the connection between the outlet opening 336 and an exhaust duct (not shown) is also maintained.

It is also possible to employ a configuration in which no ribs are provided in the main duct D1 as illustrated in FIG. 19 in the first and second embodiments.

The respective embodiments and variations of the present disclosure have been described above, but the present disclosure is not limited to the embodiments described above, and various modifications and variations can be made thereto.

While the above-described embodiments describe the image forming apparatus that forms color images, the present disclosure can also be applied to an image forming apparatus that forms monochromatic (monochrome) images. The present disclosure can be used, for example, in image forming apparatuses (for example, copiers, facsimiles, printers, multifunction machines, etc.) that form images on media using the electrophotographic method.

Various aspects of the present disclosure are collectively described below as appendixes.

APPENDIX 1

An image forming apparatus comprising:

an image forming unit including an image bearing body; and an exposure unit including an exposure portion that emits light to expose the image bearing body to form a latent image, wherein the exposure unit has a duct unit extending in a longitudinal direction of the image forming unit, wherein the duct unit has an inlet opening through which air flows into the duct unit and an outlet opening through which the air is discharged from the duct unit, and wherein the exposure unit is provided pivotably about a virtual straight line passing through the inlet opening.

APPENDIX 2

The image forming apparatus according to appendix 1, wherein the duct unit has a first rib and a second rib that is farther from the inlet opening than the first rib, and wherein an acute angle formed by the first rib with respect to the longitudinal direction is larger than an acute angle formed by the second rib with respect to the longitudinal direction.

APPENDIX 3

The image forming apparatus according to appendix 1 or 2, wherein the duct unit has a first rib, a second rib that is farther from the inlet opening than the first rib, and a third rib that is farther from the inlet opening than the second rib, and wherein when a distance from an end of the first rib on the inlet opening side to an end of the second rib on the inlet opening side is defined as A1, and a distance from an end of the second rib on the inlet opening side to an end of the third rib on the inlet opening side is defined as A2, A1<A2 is established.

APPENDIX 4

The image forming apparatus according to any one of appendixes 1 to 3, wherein the duct unit has a first rib and a second rib that is farther from the inlet opening than the first rib, and wherein a distance L2 from the inlet opening to the second rib is longer than a distance L1 from the inlet opening to the first rib.

APPENDIX 5

The image forming apparatus according to appendix 3, wherein the duct unit has a fourth rib that is farther from the inlet opening than the third rib, and wherein, when a distance from an end of the third rib on the inlet opening side to an end of the fourth rib on the inlet opening side is defined as A3, A2<A3 is satisfied.

APPENDIX 6

The image forming apparatus according to any one of appendixes 1 to 5, wherein the duct unit comprises:

a first duct extending in the longitudinal direction, and a second duct that connects the inlet opening with the first duct, and wherein the second duct extends from the inlet opening toward the outlet opening while being inclined with respect to the longitudinal direction.

APPENDIX 7

The image forming apparatus according to appendix 6, wherein the inlet opening is disposed on one end side of the duct unit in the longitudinal direction, and wherein the second duct extends from the inlet opening toward the one end side of the outlet opening.

APPENDIX 8

The image forming apparatus according to any one of appendixes 1 to 7, wherein the inlet opening is disposed at a center of the duct unit in the longitudinal direction, and wherein the duct unit has at least one rib that guides air having flowed in through the inlet opening in such a manner that the air spreads in the longitudinal direction.

APPENDIX 9

The image forming apparatus according to any one of appendixes 1 to 8, wherein the inlet opening is disposed on each of both ends of the duct unit in the longitudinal direction, and wherein the duct unit has at least one rib that guides the air having flowed in through the inlet opening in such a manner that the air spreads toward a center of the duct unit in the longitudinal direction.

APPENDIX 10

The image forming apparatus according to any one of appendixes 1 to 9, wherein the image forming unit has a heat sink at a position on which the air discharged from the outlet opening of the duct unit is blown.

APPENDIX 11

The image forming apparatus according to any one of appendixes 1 to 10, wherein the exposure unit has a heat sink at a position on which the air discharged from the outlet opening of the duct unit is blown, the heat sink being in contact with the image forming unit.

APPENDIX 12

The image forming apparatus according to any one of appendixes 1 to 11, wherein the image forming unit comprises:

a developer bearing body bearing a developer to adhere to the image bearing body; and a layer regulating unit including a layer regulating member that extends in the longitudinal direction and regulates a thickness of a layer of the developer on a surface of the developer bearing body, and wherein the outlet opening of the duct unit is disposed to face the layer regulating unit.

APPENDIX 13

The image forming apparatus according to appendix 12, wherein the layer regulating unit has a surface on which the air discharged from the outlet of the duct unit is blown, the surface having convexes or concaves.

APPENDIX 14

The image forming apparatus according to any one of appendixes 1 to 13, further comprising:

a fan that feeds air to the inlet opening of the duct unit.

APPENDIX 15

An image forming apparatus comprising:

an image forming unit including an image bearing body; and an exposure unit including an exposure portion that emits light to expose the image bearing body to form a latent image, wherein the exposure unit has a duct unit extending in a longitudinal direction of the image forming unit, wherein the duct unit has an inlet opening through which air flows into the duct unit and an outlet opening through which the air is discharged from the duct unit, wherein the duct unit has a first rib and a second rib that is farther from the inlet opening than the first rib, and wherein an acute angle formed by the first rib with respect to the longitudinal direction is larger than an acute angle formed by the second rib with respect to the longitudinal direction.

DESCRIPTION OF REFERENCE CHARACTERS

1: image forming apparatus, 2, 2K, 2Y, 2M, 2C: exposure unit (exposure device), 3, 3A, 3B, 230: duct unit, 20: head holder (holder), 21L, 21R: support shaft, 22L, 22R: arm, 24L, 24R, 25: side wall, 26: top plate, 29: inclined plate, 30: duct forming body, 31: main portion, 32: introduction portion, 35: inlet opening (first opening), 36: outlet opening (second opening), 41: rib (first rib), 42: rib (second rib), 43: rib (third rib), 44: rib (fourth rib), 45: partition plate, 50: exposure head (exposure portion), 51: substrate, 52: lens array, 60: fan unit, 61K, 61Y, 61M, 61C: branch duct, 65: fan, 70: top cover (opening-and-closing member), 71L, 71R: side plate, 72: support portion, 80: housing, 100: layer regulating unit, 101: blade holder, 103: heat sink, 105: convex portion (uneven shape), 220: head holder (holder), 221L, 221R: support shaft, 222L, 222R: arm, 230: duct unit, 231: main portion, 232: introduction portion, 235: inlet opening (first opening), 236: outlet opening (second opening), 241: rib (first rib), 242: rib (second rib), 243: rib (third rib), 244: rib (fourth rib), 245: partition plate, D1: main duct (first duct), D2: introduction duct (second duct).

What is claimed is:

1. An image forming apparatus comprising:

an image forming unit including an image bearing body; and an exposure unit including an exposure portion that emits light to expose the image bearing body to form a latent image, wherein the exposure unit has a duct unit extending in a longitudinal direction of the image forming unit, wherein the duct unit has an inlet opening through which air flows into the duct unit and an outlet opening through which the air is discharged from the duct unit, and wherein the exposure unit is provided pivotably about a virtual straight line passing through the inlet opening.

2. The image forming apparatus according to claim 1, wherein the duct unit has a first rib and a second rib that is farther from the inlet opening than the first rib, and wherein an acute angle formed by the first rib with respect to the longitudinal direction is larger than an acute angle formed by the second rib with respect to the longitudinal direction.

3. The image forming apparatus according to claim 1, wherein the duct unit has a first rib, a second rib that is farther from the inlet opening than the first rib, and a third rib that is farther from the inlet opening than the second rib, and wherein when a distance from an end of the first rib on the inlet opening side to an end of the second rib on the inlet opening side is defined as A1, and a distance from an end of the second rib on the inlet opening side to an end of the third rib on the inlet opening side is defined as A2, A1<A2 is established.

4. The image forming apparatus according to claim 3, wherein the duct unit has a fourth rib that is farther from the inlet opening than the third rib, and wherein, when a distance from an end of the third rib on the inlet opening side to an end of the fourth rib on the inlet opening side is defined as A3, A2<A3 is satisfied.

5. The image forming apparatus according to claim 1, wherein the duct unit has a first rib and a second rib that is farther from the inlet opening than the first rib, and wherein a distance L2 from the inlet opening to the second rib is longer than a distance L1 from the inlet opening to the first rib.

6. The image forming apparatus according to claim 1, wherein the duct unit comprises:

a first duct extending in the longitudinal direction, a second duct that connects the inlet opening with the first duct, and wherein the second duct extends from the inlet opening toward the outlet opening while being inclined with respect to the longitudinal direction.

7. The image forming apparatus according to claim 6, wherein the inlet opening is disposed on one end side of the duct unit in the longitudinal direction, and wherein the second duct extends from the inlet opening toward the one end side of the outlet opening.

8. The image forming apparatus according to claim 1, wherein the inlet opening is disposed at a center of the duct unit in the longitudinal direction, and wherein the duct unit has at least one rib that guides air having flowed in through the inlet opening in such a manner that the air spreads in the longitudinal direction.

9. The image forming apparatus according to claim 1, wherein the inlet opening is disposed on each of both ends of the duct unit in the longitudinal direction, and wherein the duct unit has at least one rib that guides the air having flowed in through the inlet opening in such a manner that the air spreads toward a center of the duct unit in the longitudinal direction.

10. The image forming apparatus according to claim 1, wherein the image forming unit has a heat sink at a position on which the air discharged from the outlet opening of the duct unit is blown.

11. The image forming apparatus according to claim 1, wherein the exposure unit has a heat sink at a position on which the air discharged from the outlet opening of the duct unit is blown, the heat sink being in contact with the image forming unit.

12. The image forming apparatus according to claim 1, wherein the image forming unit comprises:

a developer bearing body bearing a developer to adhere to the image bearing body; and a layer regulating unit including a layer regulating member that extends in the longitudinal direction and regulates a thickness of a layer of the developer on a surface of the developer bearing body, and wherein the outlet opening of the duct unit is disposed to face the layer regulating unit.

13. The image forming apparatus according to claim 12, wherein the layer regulating unit has a surface on which the air discharged from the outlet opening of the duct unit is blown, the surface having convexes or concaves.

14. The image forming apparatus according to claim 1, further comprising:

a fan that feeds air to the inlet opening of the duct unit.

15. An image forming apparatus comprising:

an image forming unit including an image bearing body; and an exposure unit including an exposure portion that emits light to expose the image bearing body to form a latent image, wherein the exposure unit has a duct unit extending in a longitudinal direction of the image forming unit, wherein the duct unit has an inlet opening through which air flows into the duct unit and an outlet opening through which the air is discharged from the duct unit, wherein the duct unit has a first rib and a second rib that is farther from the inlet opening than the first rib, and wherein an acute angle formed by the first rib with respect to the longitudinal direction is larger than an acute angle formed by the second rib with respect to the longitudinal direction.

* * * * *